(12) United States Patent
Long et al.

(10) Patent No.: US 11,845,058 B2
(45) Date of Patent: Dec. 19, 2023

(54) COOPERATIVE CHEMICAL ADSORPTION OF ACID GASES IN FUNCTIONALIZED METAL-ORGANIC FRAMEWORKS

(71) Applicant: THE REGENTS OF THE UNIVERSITY OF CALIFORNIA, Oakland, CA (US)

(72) Inventors: Jeffrey R. Long, Oakland, CA (US); Thomas M. McDonald, Berkeley, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 23 days.

(21) Appl. No.: 16/912,137

(22) Filed: Jun. 25, 2020

(65) Prior Publication Data
US 2020/0391179 A1 Dec. 17, 2020

Related U.S. Application Data

(60) Division of application No. 15/297,114, filed on Oct. 18, 2016, now Pat. No. 10,722,863, which is a (Continued)

(51) Int. Cl.
*B01D 53/40* (2006.01)
*B01D 53/02* (2006.01)
(Continued)

(52) U.S. Cl.
CPC ............ *B01J 20/226* (2013.01); *B01D 53/02* (2013.01); *B01D 53/40* (2013.01); *B01D 53/62* (2013.01);
(Continued)

(58) Field of Classification Search
None
See application file for complete search history.

(56) References Cited

U.S. PATENT DOCUMENTS 6,547,854 B1 4/2003 Gray
7,288,136 B1 10/2007 Gray
(Continued)

FOREIGN PATENT DOCUMENTS

CA 2867284 A1 9/2013
CN 101151091 A 3/2008
(Continued)

OTHER PUBLICATIONS

Supplementary Info. sheets for McDonald et al., "Capture of Carbon Dioxide from Air and Flue Gas in the AlkylamineAppended Metal-Organic Framework mmen-Mg2(dobpdc)." J. Am. Chem. Soc., vol. 134, pp. 7056-7065; published Apr. 4, 2012.*
(Continued)

*Primary Examiner* — Daniel Berns
(74) *Attorney, Agent, or Firm* — O'BANION & RITCHEY LLP; John P. O'Banion

(57) ABSTRACT

A system and method for acid gas separations using porous frameworks of metal atoms coordinatively bound to polytopic linkers that are functionalized with basic nitrogen ligands that expose nitrogen atoms to the pore volumes forming adsorption sites. Adjacent basic nitrogen ligands on the metal-organic framework can form an ammonium from one ligand and a carbamate from the other. The formation of one ammonium carbamate pair influences the formation of ammonium carbamate on adjacent adsorption sites. Adsorption of acid gas at the adsorption sites form covalently linked aggregates of more than one ammonium carbamate ion pair. The acid gas adsorption isotherm can be tuned to match the step position with the partial pressure of acid gas in the gas mixture stream through manipulation of the metal-ligand
(Continued)

bond strength by selection of the ligand, metal and polytopic linker materials.

9 Claims, 9 Drawing Sheets

Related U.S. Application Data continuation of application No. PCT/US2015/027165, filed on Apr. 22, 2015, and a continuation-in-part of application No. 14/228,532, filed on Mar. 28, 2014, which is a continuation of application No. PCT/US2012/060915, filed on Oct. 18, 2012.

(60) Provisional application No. 61/982,620, filed on Apr. 22, 2014, provisional application No. 61/548,676, filed on Oct. 18, 2011.

(51) Int. Cl.
  *B01D 53/62* (2006.01)
  *B01D 53/80* (2006.01)
  *B01D 53/81* (2006.01)
  *B01J 20/22* (2006.01)
  *B01J 20/28* (2006.01)
  *B01J 20/30* (2006.01)
  *B01J 20/34* (2006.01)
  *B01J 31/16* (2006.01)

(52) U.S. Cl.
  CPC ..... *B01J 20/28057* (2013.01); *B01J 20/3085* (2013.01); *B01J 20/3425* (2013.01); *B01J 20/3483* (2013.01); *B01D 2253/204* (2013.01); *B01D 2257/504* (2013.01); *B01D 2258/0283* (2013.01); *Y02C 20/40* (2020.08)

(56) References Cited

U.S. PATENT DOCUMENTS

| | | | |
|---|---|---|---|
| 9,861,953 | B2 | 1/2018 | Long |
| 2008/0121105 | A1 | 5/2008 | Schubert |
| 2010/0154635 | A1 | 6/2010 | Schubert |
| 2011/0104213 | A1 | 5/2011 | Rosi |
| 2012/0070353 | A1 | 3/2012 | Trukhan |

FOREIGN PATENT DOCUMENTS

| | | |
|---|---|---|
| CN | 101816924 A | 9/2010 |
| WO | 2010106133 A1 | 9/2010 |
| WO | 2010148276 A2 | 12/2010 |
| WO | 2013059527 | 4/2013 |
| WO | 2013059527 A1 | 4/2013 |
| WO | 2013144628 | 10/2013 |
| WO | 2013144628 A1 | 10/2013 |

OTHER PUBLICATIONS

Lee et al., "Diamine-functionalized metal-organic framework: exceptionally high CO2 capacities from ambient air and flue gas, ultrafast CO2 uptake rate, and adsorption mechanism." Energy Environ. Sci., 2014, vol. 7, pp. 744-751 (published Nov. 4, 2013) ( incl. Supplementary Info. sheets).*
Korean Intellectual Property Office (KIPO), International Search Report and Written Opinion, dated Jul. 24, 2015, related PCT International Application No. PCT/US2015/027165, pp. 1-14, with claims searched, pp. 15-19.
Mcdonald, Thomas M. et al., "Cooperative insertion of CO2 in diamine-appended metal-organic frameworks", Nature, Mar. 19, 2015, (Epub. Mar. 11, 2015), vol. 519, No. 7543, pp. 303-308.
Korean Intellectual Property Office (KIPO), International Search Report and Written Opinion, dated Mar. 22, 2013, related PCT International Application No. PCT/US2012/060915, pp. 1-10, with claims searched, pp. 11-14. The relevance of non-English language reference WO 2010-106133 is indicated therein.
Mcdonald, Thomas M. et al., "Enhanced carbon dioxide capture upon incorporation of N,N'- dimethylethylenediamine in metal-organic framework CuBTTri", Chem. Sci., Aug. 2, 2011, vol. 2, pp. 2022-2028.
European Patent Office (EPO), European Supplemental Search Report, dated May 8, 2015, related European Patent Application No. 12841410.9, pp. 1-10, with claims searched, pp. 11-13.
Demessence et al., "Strong CO2 Binding in a Water-Stable, Triazolate-Bridged Metal-Organic Framework Functionalized with Ethylenediamine", J. Am. Chem. Soc. (2009), vol. 131, pp . 8784-8786 (published online Jun. 8, 2009).
Demessence et al., Supporting Information for "Strong CO2 Binding in a Water-Stable, Triazolate-Bridged Metal-Organic Framework Functionalized with Ethylenediamine", J. Am. Chem. Soc. (2009), vol. 131, pp . 8784-8786 (published online Jun. 8, 2009).
Hwang et al., "Amine Grafting on Coordinatively Unsaturated Metal Centers of MOFs: Consequences for Catalysis and Metal Encapsulation", Angew. Chem. Int. Ed. 2008, 47, 4144-4148 (published online Apr. 24, 2008).
Hwang et al., Supporting Information for "Amine Grafting on Coordinatively Unsaturated Metal Centers of MOFs: Consequences for Catalysis and Metal Encapsulation", Angew. Chem. Int. Ed. 2008, 47, 4144-4148 (published online Apr. 24, 2008).
Mcdonald, Thomas M. et al., "Capture of Carbon Dioxide from Air and Flue Gas in the Alkylamine-Appended Metal-Organic Framework mmen-Mg2(dobpdc)", Journal of the American Chemical Society, 2012, 134 (16), pp. 7056-7065, Apr. 4, 2012.
European Patent Office (EPO), Communication (ESSR) dated Oct. 27, 2017, related European patent application No. 15782401.2, pp. 1-7, with claims searched, pp. 8-10.
State Intellectual Property Office of the People's Republic of China (SIPO), The First Office Action dated Jul. 4, 2018, related Chinese patent application No. 201580030107.3, Chinese language document pp. 1-11, English language translation pp. 12-25, claims examined pp. 26-30.
Japanese Patent Office (JPO), Office Action dated Dec. 4, 2018, related Japanese patent application No. 2016-562842, Japanese-language document pp. 1-9, English-language translation pp. 10-17, claims examined pp. 18-22.
IP Australia, "Examination report No. 1 for standard patent application" dated Mar. 3, 2019, related Australian patent application No. 2015249696, pp. 1-4, claims examined, pp. 5-9.
State Intellectual Property Office of the People's Republic of China (SIPO), The Second Office Action dated Jun. 14, 2019, related Chinese patent application No. 201580030107.3, Chinese language document pp. 1-7, English language translation pp. 8 to 15, claims examined pp. 16 to 19.
Mcdonald, Thomas M. et al., "Enhanced carbon dioxide capture upon incorporation of N,N'- dimethylethylenediamine in metal-organic framework CuBTTri", Chemical Science, DOI: 10.1039/c1sc00354b (paper and supporting information), published online Aug. 2, 2011.
European Patent Office (EPO), Communication pursuant to Article 94(3) EPC (office action) dated Nov. 22, 2019, related European patent application No. 15782401.2, pp. 1-8, claims examined, pp. 9-10.
Japanese Patent Office (JPO), Office Action dated Nov. 22, 2019, related Japanese patent application No. 2016-562842, Japanese-language document pp. 1-6, English-language translation pp. 7-17, claims examined pp. 18-22.
State Intellectual Property Office of the People's Republic of China (SIPO), Notice of Third Office Action dated Feb. 10, 2020, related Chinese patent application No. 201580030107.3, Chinese language document pp. 1-5, English language translation pp. 6 to 12, claims examined pp. 13 to 17.
State Intellectual Property Office of the Peoples Republic of China (SIPO), the Fourth Office Action dated Aug. 19, 2020, related Chinese patent application No. 201580030107.3, pp. 1-7, English-language ranslation, pp. 8-16, claims examined, pp. 17-20.

(56) References Cited

OTHER PUBLICATIONS

Canadian Intellectual Property Office, Communication dated Jul. 22, 2022, related Canadian patent application No. 2,945,783, pp. 1-4 claims searched, pp. 5-8.
Canadian Intellectual Property Office, Communication dated Jan. 10, 2022, related Canadian patent application No. 2,945,783, pp. 1-4, claims searched, pp. 5-7.

* cited by examiner

COOPERATIVE CHEMICAL ADSORPTION OF ACID GASES IN FUNCTIONALIZED METAL-ORGANIC FRAMEWORKS

CROSS-REFERENCE TO RELATED APPLICATIONS

This application is a divisional of U.S. patent application Ser. No. 15/297,114 filed on Oct. 18, 2016, incorporated herein by reference in its entirety, which is a 35 U.S.C. § 111(a) continuation of PCT international application number PCT/US2015/027165 filed on Apr. 22, 2015, incorporated herein by reference in its entirety, which claims priority to, and the benefit of, U.S. provisional patent application Ser. No. 61/982,620 filed on Apr. 22, 2014, incorporated herein by reference in its entirety, and is also a continuation-in-part of now abandoned U.S. patent application Ser. No. 14/228,532 filed on Mar. 28, 2014, incorporated herein by reference in its entirety, which is a 35 U.S.C. § 111(a) continuation of PCT international application number PCT/US2012/060915 filed on Oct. 18, 2012, incorporated herein by reference in its entirety, which claims the benefit of U.S. provisional patent application Ser. No. 61/548,676 filed on Oct. 18, 2011, incorporated herein by reference in its entirety. Priority is claimed to each of the foregoing applications.

The above-referenced PCT international application number PCT PCT/US2015/027165 was published as PCT International Publication No. WO 2015/164543 on Oct. 29, 2015, which publication is incorporated herein by reference in its entirety. The above-referenced PCT international application number PCT/US2012/060915 was published as PCT International Publication No. WO 2013/059527 on Apr. 25, 2013, which publication is incorporated herein by reference in its entirety.

STATEMENT REGARDING FEDERALLY SPONSORED RESEARCH OR DEVELOPMENT

This invention was made with government support under DE-SC0001015, DE-AR0000103 and DE-AR0000402 awarded by the Department of Energy. The Government has certain rights in the invention.

BACKGROUND

1. Technical Field

The present technology pertains generally to fluid stream separation schemes and methods for producing metal-organic frameworks, and more particularly to the production and use of metal-organic frameworks with metal atoms that are coordinatively bound to polytopic linkers and ligands that expose basic nitrogen atoms to the pore volumes and the flow of gases.

2. Background

Carbon dioxide generated from the combustion of fossil fuels for heat and electricity production is a major contributor to climate change and ocean acidification. The predicted growth of the global economy and world population in the near future will lead to an increased demand for energy, resulting in even further increases in the concentration of $CO_2$ in the atmosphere. In 2012, coal and natural gas fired power plants released more than 11.1 gigatons of carbon dioxide in to the atmosphere, which accounts for nearly 30% of total global emissions.

To mitigate the effects of rising atmospheric $CO_2$ levels related to the burning of fossil fuels, various strategies are used to control and capture $CO_2$ emissions. However, there few financial incentives to reduce $CO_2$ emissions in many countries and existing carbon capture technologies are simply too expensive to be practical at the scales required for large power plants that can release several tons of $CO_2$ per minute. The most expensive component of any carbon capture and sequestration process is usually the separation of $CO_2$ from the other gases that are present in the flue gas of a power plant. There is a need for the development of new materials and processes to remove $CO_2$ from flue gas using as little energy and cost as possible.

While the exact composition of a flue gas depends on the design of the power plant and the source of natural gas or coal, a mixture of mostly $N_2$, $CO_2$, and $H_2O$ is present along with potentially more reactive gases that are in lower concentrations, such as $O_2$, SOx, NOx, and CO. Typical flue gas is also released at ambient pressure and at temperatures ranging from about 40° C. to 80° C.

The separation of $CO_2$ from $H_2$ is also important in the context of two distinct applications: (i) the capture of pre and post combustion $CO_2$ emissions like those produced from coal gasification power plants, and (ii) the purification of hydrogen gas, which is synthesized on large scales annually. Separation of $CO_2$ from $CH_4$ is another separation relevant to the purification of natural gas, which can have up to 92% $CO_2$ impurity at its source. Carbon dioxide removal is required for approximately 25% of the natural gas reserves in the United States. Removal of $CO_2$, is typically conducted at pressures between 20 bar and 70 bar with existing processes.

The removal of $CO_2$ from low-pressure flue gas mixtures and other $CO_2$ gas separations is generally performed with aqueous amine solutions that are selective for acid gases. Amines are known to be very selective toward $CO_2$ capture from flue gases or feedstock gases because of the strong chemical bonds formed in the chemisorption process. However, the use of these liquid materials has a number of drawbacks. Regeneration of such absorbents is only possible at high temperatures and the system therefore requires a high input of energy. In addition, corrosion inhibitors need to be used with aqueous amine materials increasing cost, and amine vapors can contaminate the gas streams that are being treated.

As a result of the large energy penalty for desorbing $CO_2$ from such liquid absorbents, solid adsorbents with significantly lower heat capacities are frequently proposed as promising alternatives. Advanced solid adsorbents also have the potential to decrease significantly the cost of $CO_2$ removal from the effluent streams of fossil fuel-burning power plants.

Solid adsorbents, including zeolites, activated carbons, silicas, and metal-organic frameworks, have received significant attention as alternatives to amine solutions, demonstrating high $CO_2$ capacities and high selectivities for $CO_2$ over $N_2$, together with reduced regeneration energy penalties. For example, zeolites have attracted attention as solid adsorbents for carbon dioxide capture. Compared to aqueous alkanolamine absorbents, zeolites require significantly less energy input for adsorbent regeneration. However, zeolites have hydrophilic properties that limit their application to separations that do not include water.

Activated carbon is another solid adsorbent for carbon dioxide separations that requires less energy for regeneration and its hydrophobic properties lead to better performance under moisture conditions compared to zeolites. While the high surface area of activated carbon contributes to much higher carbon dioxide capture capacities at high pressures, it does not perform very well at low pressure ranges.

Metal organic frameworks, (MOFs), an emerging class of nanoporous crystalline solids built of metal coordination sites linked by organic molecules, show promising properties for gas capture applications. Due to their high surface areas and tunable pore chemistry, the separation capabilities of certain metal-organic frameworks have been shown to meet or exceed those achievable by zeolite or carbon adsorbents.

Although metal organic framework materials offer well-defined porosity, high surface area, and tunable chemical functionalities, many materials have hydrophilic properties that limit their application since it is observed that the $CO_2$ uptake capacity dramatically decreases in humid conditions.

Accordingly, there is a need for efficient methods and materials for selectively separating constituent gases from a stream of gases that can be performed at lower temperatures and pressures and regeneration energies than existing techniques. There is also a need for materials and methods that provide effective separations at low cost. The present invention satisfies these needs as well as others and is generally an improvement over the art.

BRIEF SUMMARY

The technology pertains to cooperative chemical adsorption of carbon dioxide in metal-organic frameworks and to metal-organic frameworks as tunable phase-change adsorbents for the efficient capture and separation of acid gases, as illustrated by carbon dioxide separations.

From the description herein it will be appreciated that materials and methods are provided that allow manipulation of a general mechanism utilizing two adjacent amines on a metal-organic framework or other porous structure to form an ammonium from one amine and a carbamate from the other amine. The formation of one ammonium carbamate pair influences the formation of ammonium carbamate on adjacent adsorption sites.

An acid gas is defined as any gas that can form a covalent bond with an amine or other basic nitrogen group on the ligand or any gas that results in the formation of ammonium with an amine upon adsorption. For example, the methods can work for any gas that is capable of a chemical reaction with an amine including $CO_2$, $SO_2$, $CS_2$, $H_2S$, $SO_3$, $SR_2$, $RSH$, $NO_2$, $NO_3$, $NO$, $BR_3$, and $NR_3$ etc.

In the case of carbon dioxide separations, there are two adsorption sites that adsorb one $CO_2$. Cooperativity occurs with more than just two adsorption sites. A large number of amines adsorb $CO_2$ at the same time forming chains of ammonium carbamate. These chains spatially extend along the pore surface in at least one direction. Aggregates can also form. Adsorption sites adapt a regular, and repeating orientation. The new orientation allows each site to contribute to the adsorption of two or more $CO_2$ molecules. Cooperative chemical adsorption may involve different elements. The strength, nature, and number of covalent, coordinate, hydrogen, and ionic bonds in the adsorbent or acid gas may increase or decrease. New bonds form between the adsorbent and $CO_2$ and existing bonds between different components of the adsorbent may weaken or break.

This cooperativity results in a large increase in the amount of gas adsorbed with only a small change in adsorption conditions. This is best manifested as a discontinuity (step) in the adsorption isotherm. The metal-organic frameworks for $CO_2$ adsorption produce an unusually shaped isotherm (the relationship between $CO_2$ adsorption amount and $CO_2$ pressure at constant temperature). For traditional adsorbents, the first derivative of the isotherm (in its functional function form of gas uptake versus pressure) is always positive and its value decreases monotonically as pressure is increased from low pressure to high pressure. For cooperative adsorbents, the first derivative of the isotherm is also positive. Before the step, the first derivative of the isotherm also decreases; however, at the step point the value of the positive first derivative suddenly increases over a pressure regime. After the step concludes, the first derivative resumes the expected decrease with increasing pressure. It is possible for more than one step to exist in each isotherm.

It was found that the reason for the isotherm shape is the mechanism by which $CO_2$ is adsorbed. An amine which was previously bonded to a metal-organic framework is reorganized. The reorganization is dependent on the identity of the metal atoms in the framework. The mechanism is general to metal sites with closely spaced amines (or other atoms) coordinated to them.

For measurements at two different temperatures, the isotherm step moves to higher pressures at higher temperatures. Unlike other adsorbents, the shape of the isotherm allows the material to adsorb $CO_2$ more efficiently at higher temperatures. Most adsorbents adsorb $CO_2$ less efficiently with higher temperatures. Advantages of $CO_2$ adsorption at higher temperatures include reducing the amount of water adsorbed, reducing the size of the adsorption bed, and reducing the temperature swing of the material between adsorption and regeneration.

It can be seen that this mechanism is different from how other amine-based adsorbents capture $CO_2$ or other acid gases and that by understanding the mechanism it has been possible to tune the $CO_2$ adsorption isotherm to match the step position with the partial pressure of $CO_2$ in the gas mixture. Initially, in the present mechanism for $CO_2$ capture, the $CO_2$ binding involves breaking a nitrogen-element bond, where the element is not hydrogen. All other amine-based adsorbents are understood to bind $CO_2$ by breaking a nitrogen-hydrogen bond.

Secondly, it has been shown that the $CO_2$ adsorption isotherm step position is related to the metal-amine bond strength. This is not how other amine-based $CO_2$ adsorbents work. It is possible to match the step position to the concentration of gas for removal of an acid gas, particularly $CO_2$, by changing the strength of metal-amine bond in the framework. Adsorbent stability is also increased by changing metal-amine bond strength.

The location of the isotherm step is also dependent upon many things that can be controlled including the composition of the porous adsorbent (preferably a metal-organic framework), the temperature of adsorption, the pressure of the adsorptive, the composition of the gas mixture, the entropy of the gas mixture, and the manner in which the material was previously treated.

For example, costs can be reduced by adsorbing at higher temperatures rather than lower temperatures in some settings. The heat transfer from adsorbent to cooling fluid can be increased by adsorbing at higher temperatures rather than at lower temperatures. Stepped isotherms can also be used to raise or lower the temperature of regeneration thereby reducing the cost of regeneration.

In other settings, the amount of non-target gases ($H_2O$, $SO_2$, $N_2$, etc.) that are adsorbed can be reduced by changing the substituent's on the diamine. Adsorbent stability can be increased by using amines with boiling points above regeneration temperature of the adsorbent (i.e. using less volatile amines).

According to one aspect of the technology, a metal-organic framework family is provided that has a functionalized surface having two adjacent amines wherein an ammonium is formed from one amine and a carbamate is formed from the other amine. The metal-organic frameworks have a functionalized pore surface having adjacent amine adsorption sites that adsorb at least one $CO_2$ molecule. Adsorption sites adapt a regular, and repeating orientation. The new orientation allows each site to contribute to the adsorption of two or more $CO_2$ molecules. Adsorption also occurs without a significant change in the volume of the adsorbent.

According to another aspect of the technology, a cooperative chemical adsorption method is provided using a metal-organic framework that has functionalized surface locations with two adjacent amines. An ammonium is formed from one of the amines and a carbamate is formed from the other amine and a $CO_2$ molecule is adsorbed with the adjacent amines.

In another aspect of the technology, the two adjacent adsorption sites are a subset of a plurality of adsorption sites where cooperativity occurs and the amines adsorb $CO_2$ at the same time and form chains or aggregates of ammonium carbamate. These chains of ammonium carbamate extend along the surface of the metal-organic framework in at least one direction.

Carbon dioxide adsorption applications include: removing $CO_2$ from outside air; removing $CO_2$ from air people breath; removing $CO_2$ as a greenhouse gas from the emissions of power plants; removing $CO_2$ from natural gas; removing $CO_2$ from oxygen; sensor for the presence of $CO_2$; using the heat of adsorption for making heat; and the use of the adsorbent as a heat pump.

Further objects and aspects of the technology will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWINGS

The technology described herein will be more fully understood by reference to the following drawing which is for illustrative purposes only.

DETAILED DESCRIPTION

Referring more specifically to the drawings, for illustrative purposes, embodiments of the apparatus and methods for gas separations are generally shown. One embodiment of the technology is described generally in FIG. 1 to illustrate the methods. It will be appreciated that the methods may vary as to the specific steps and sequence and the apparatus may vary as to structural details without departing from the basic concepts as disclosed herein. The method steps are merely exemplary of the order that these steps may occur. The steps may occur in any order that is desired, such that it still performs the goals of the claimed technology.

Figure 1:
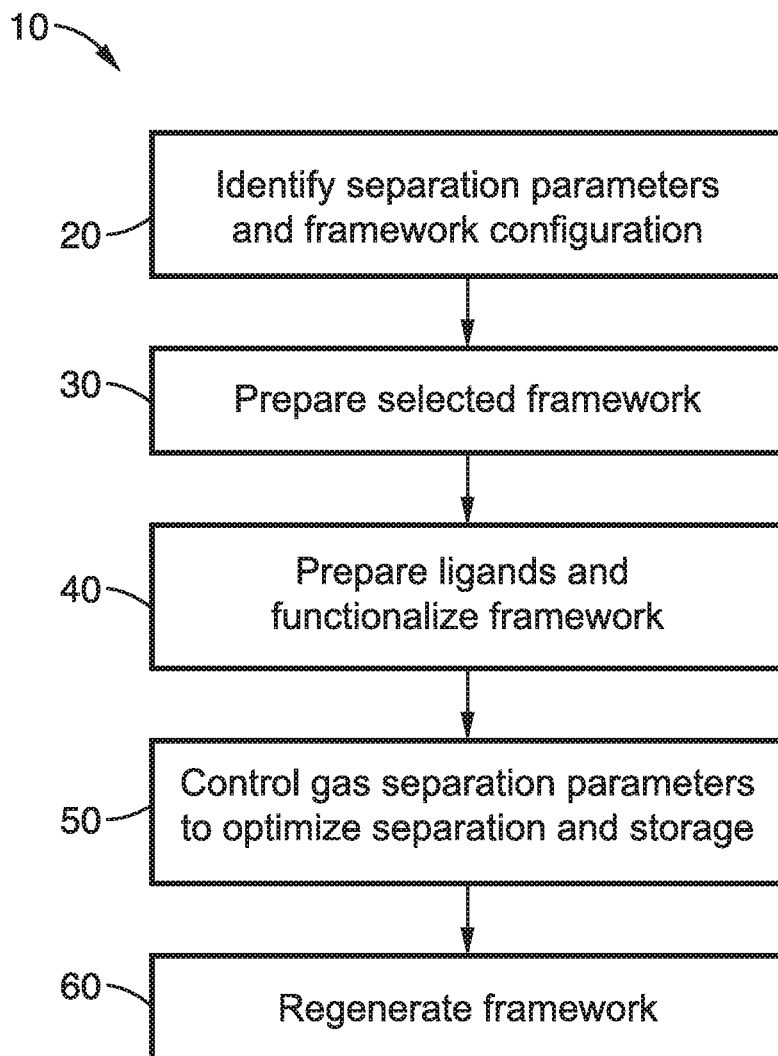
FIG. 1 is a schematic flow diagram of a method of gas separations according to one embodiment of the technology.

Turning now to FIG. 1, one method 10 for separating acid gases from a stream of gases using functionalized porous frameworks with controlled step-shaped isotherms is generally shown. The apparatus configuration and separation conditions can be optimized for gas separation capacity, temperature and pressure swings and regeneration energy.

At block 20 of the method of FIG. 1, an initial evaluation of the separation parameters is made. Typical separations include pre-combustion feedstock gas separations such as the removal of carbon dioxide from natural gas, digester gas, or syngas as well as post combustion separations such as flue gas streams.

The selection of the type of framework or particular framework can account for the composition of the gases to be treated and the temperature and pressure at the time of presentation to the separator. The regeneration energy and temperature swing requirements and framework cost, stability and reactivity can also be considered in the selection of the framework configuration and the functionalizing ligands.

The framework that is selected at block 20 is prepared at block 30 of FIG. 1. The preferred frameworks for acid gas separations are porous metal-organic framework compositions of metal atoms coordinatively bound to polytopic organic linkers that have pores whose dimensions that permit the flow of gases and have interior surfaces that expose coordinatively unsaturated metal ions. The framework is further functionalized with ligands that are bound to the coordinatively unsaturated metal ions that expose basic nitrogen atoms to the pore volumes. Ligands are prepared and the framework is functionalized at block 40.

The preferred frameworks that are prepared at block 30 are metal organic frameworks that have metal atoms in an oxidation state appropriate to binding with both a polytopic linker and basic nitrogen ligand elements. In one embodiment, the metal is one or more atoms selected from the group Al, Be, Ca, Cd, Co, Cr, Cu, Fe, Mg, Mn, Ni, Sc, Ti, V, and Zn.

Figure 4:
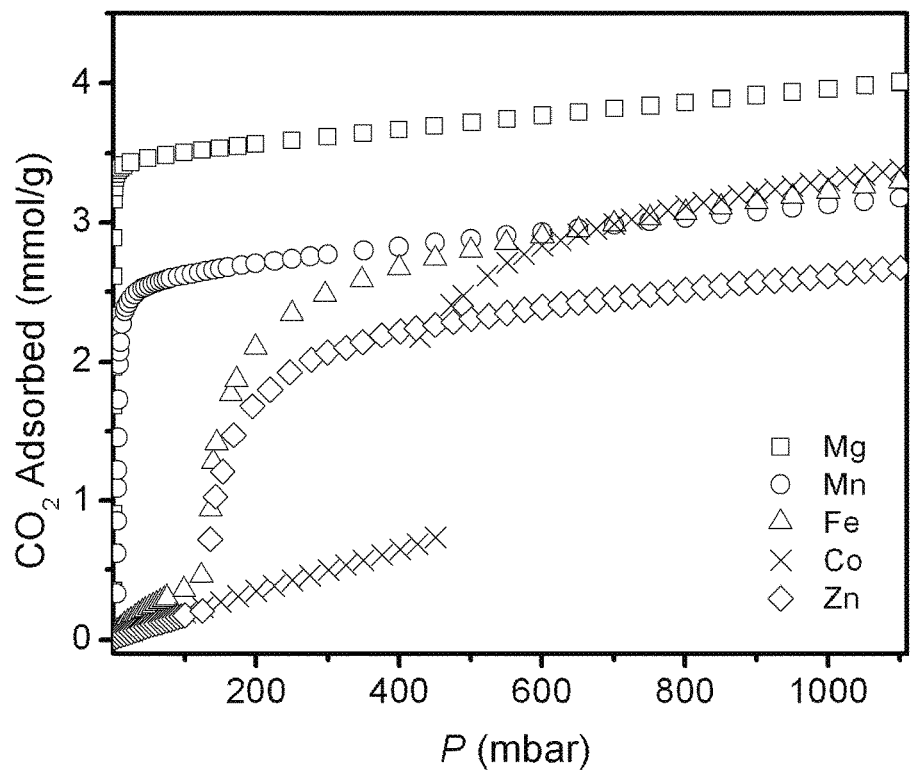
FIG. 4 depicts $CO_2$ adsorption isotherms at 40° C. shown on a linear scale for N,N'-dimethylethylenediamine derivatives of $Mg_2$(dobpdc), $Mn_2$(dobpdc), $Fe_2$(dobpdc), $Co_2$(dobpdc), and $Zn_2$(dobpdc).
Figure 5:
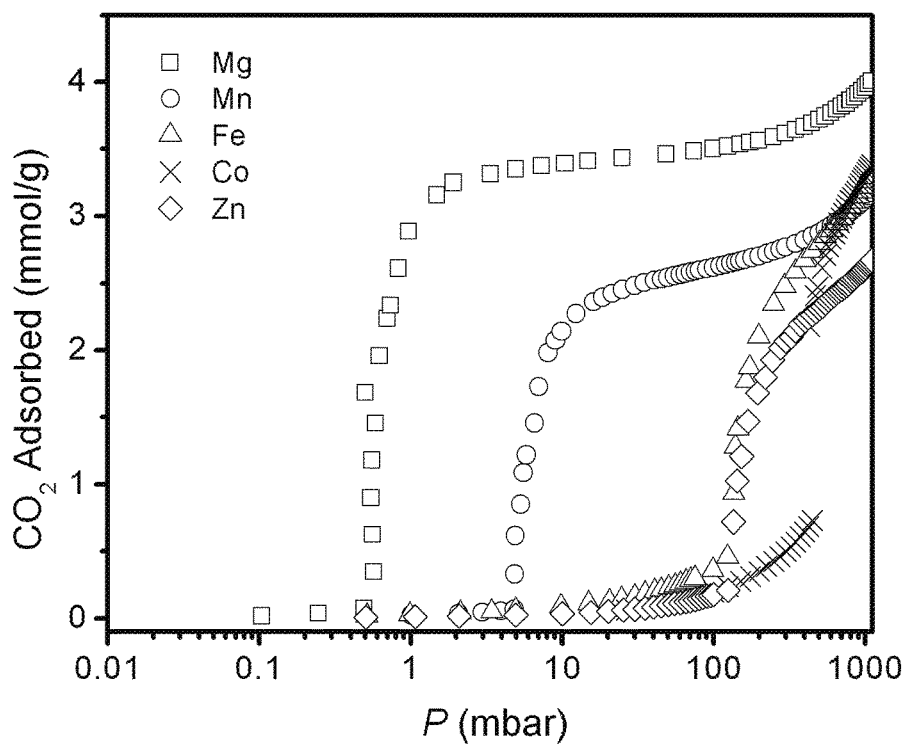
FIG. 5 depicts $CO_2$ adsorption isotherms at 40° C. shown on a logarithmic scale for N,N'-dimethylethylenediamine derivatives of $Mg_2$(dobpdc), $Mn_2$(dobpdc), $Fe_2$(dobpdc), $Co_2$(dobpdc), and $Zn_2$(dobpdc).

$CO_2$ adsorption isotherms at 40° C. shown on a linear scale and logarithmic scale for N,N'-dimethylethylenediamine derivatives of $Mg_2$(dobpdc), $Mn_2$(dobpdc), $Fe_2$(dobpdc), $Co_2$(dobpdc), and $Zn_2$(dobpdc) are shown in FIG. 4 and FIG. 5 respectively.

The structure of the metal organic framework is determined in part by the rigid or semi-rigid polytopic organic linkers that are used in its formation. Preferred polytopic linker molecules include aromatic compounds with two or more functional groups such as pyrazolate ($—C_3H_2N_2^-$), triazolate ($—C_2HN_3^-$), tetrazolate ($—CN_4^-$) or carboxylate ($—CO_2^-$) groups.

In one embodiment, the polytopic linker is composed of one or more linkers selected from the group: 1,3,5-benzenetripyrazolate; 1,3,5-benzenetristriazolate; 1,3,5-benzenetristetrazolate, 1,3,5-benzenetricarboxylate; 1,4-benzenedicarboxylate; and 2,5-dioxido-1,4-benzenedicarboxylate.

In another embodiment; the linkers containing at least two cyclic rings, two carboxylate groups, and two oxido groups such as 4,4'-dioxido-3,3'-biphenyldicarboxylate and 4'-4"-dioxido-3',3"-terphenyldicarboxylate.

There are many combinations of metals and polytopic linkers that can be fashioned to provide metal organic frameworks with desirable pore sizes and open metal sites. For example, in one embodiment, the framework has a metal is selected from the group Ca, Fe, Mn, Cu, Co, Ni, Cr, or Cd and the polytopic linker is 1,3,5-benzenetripyrazolate. In another embodiment, the metal is selected from the group Ca, Fe, Mn, Cu, Co, Ni, Cr, or Cd and the polytopic linker is 1,3,5-benzenetristetrazolate.

In another embodiment, the metal is selected from the group Cr, Mn, Fe, Co, Ni, or Cu and the polytopic linker is 1,3,5-benzenetristriazolate.

Another embodiment has a framework where the metal is selected from the group Cd, Fe, Al, Cr, Ti, Sc or V and the polytopic linker is 1,3,5-benzenetriscarboxylate or 1,4-benzenedicarboxylate.

Yet another framework has metal selected from the group Mg, Ca, Sc, Ti, V, Cr, Mn, Fe, Co, Ni, Cu or Zn and the polytopic linker is 2,5-dioxido-1,4-benzenedicarboxylate.

Another preferred framework has a metal selected from the group Mg, Ca, Sc, Ti, V, Cr, Mn, Fe, Co, Ni, Cu or Zn and the polytopic ligand is 4,4'-dioxidobiphenyl-3,3'-dicarboxylate.

The functionalizing ligand that is selected and prepared at block 40 of FIG. 1, preferably has an amine that will expose basic nitrogen atoms within the pore volume when bound to the metal organic framework. However, other basic nitrogen groups can be used. For example, in one embodiment, the basic nitrogen ligand is a primary, secondary, or tertiary alkylamine. In another embodiment, the basic nitrogen ligand is a primary or secondary imine. The preferred functionalizing ligand prepared at block 40 is a diamine. Suitable ligand diamines include: ethylenediamine, propylenediamine, butylenediamine, pentylenediamine, hexylenediamine, 1,2-propanediamine, 2,3-butanediamine, 1,2-diamino-2-methylpropane, N-boc-ethylenediamine, N-ethylethylenediamine, N,N'-diethylpropylenediamine, N,N-diethylethylenediamine, N-isopropylethylenediamine, N,N'-diisopropylethylenediamine, N-isopropylpropylenediamine, N,N'-diisopropylpropylenediamine, N,N'-diisopropylethylenediamine, N-methylethylenediamine, N,N'-dimethylethylenediamine, N-methylpropylenediamine, N,N'-dimethylpropylenediamine, 1,3-diaminocyclohexane, N,N-dimethylethylenediamine, N,N,N'-trimethylethylenediamine, N,N,N',N'-tetramethylethylenediamine, N-trimethylsilylethylenediamine, N,N-bis(trimethylsilyl)ethyleneidmaine, N,N'-bis(trimethylsilyl)ethyleneidmaine, N,N-dimethylpropylenediamine, N,N,N'-trimethylpropylenediamine, N,N,N',N'- tetramethylpropylenediamine, diethylenetriamine, 2-(2-aminoethyoxy)ethylamine, dipropylenetriamine, 1,2-diaminocyclohexane, piperazine, and tris(2-aminoethyl) amine. Other ligands include 2-(Diisopropylphosphino) ethylamine N-methylethanolamine, and monoethanolamine.

Accordingly, the mechanism can work for separating any acid gas that can chemically react with an amine including $CO_2$, $SO_2$, $CS_2$, $H_2S$, $SO_3$, $SR_2$, RSH, $NO_2$, $NO_3$, NO, $BR_3$ and $NR_3$.

For carbon dioxide separations, a diamine or polyamine ligand is particularly preferred. In this case the metal-organic framework composition has adjacent amine groups where exposure to $CO_2$ results in reversible formation of an ammonium carbamate complex from pairs of adjacent amines. Here adjacent amine groups have basic nitrogen atoms separated by less than 1 nm. This proximity allows a proton transfer to occur. For example $CO_2$ binding of this type is not achieved without proton transfer from one amine to the next to form an ammonium carbamate ion pair. The formation of a first ammonium carbamate complex lowers energetic barriers that enable subsequent complexes to be formed under the same conditions of temperature and pressure.

One particularly preferred configuration for carbon dioxide separations is a framework formed from a 4,4'-dioxidobiphenyl-3,3'-dicarboxylate polytopic ligand and a basic nitrogen ligand of N, N'-dimethylethylenediamine and the metal is selected from the group Mg, Ca, Sc, Ti, V, Cr, Mn, Fe, Co, Ni, Cu or Zn.

The frameworks that are prepared at blocks 30 and 40, are tunable phase-change adsorbents that permit the cooperative chemical adsorption of carbon dioxide and other acid gases in metal-organic frameworks for efficient gas separations and capture.

It has been shown that the metal-organic frameworks for $CO_2$ adsorption, for example, produce an unusually shaped isotherm (the relationship between $CO_2$ adsorption amount and $CO_2$ pressure at constant temperature) that gives these materials excellent properties. It was found that the reason for the isotherm shape is the mechanism by which the acid gas is adsorbed. The amine ligand which was previously bonded to a metal-organic framework is reorganized. The reorganization is dependent on the metal of the framework. The mechanism is general to metal sites with closely spaced amines (or other atoms) coordinated to them. Unlike other adsorbents, the shape of the isotherm allows the material to adsorb $CO_2$ more efficiently at higher temperatures as most adsorbents adsorb $CO_2$ less efficiently with higher temperatures.

Figure 2A:
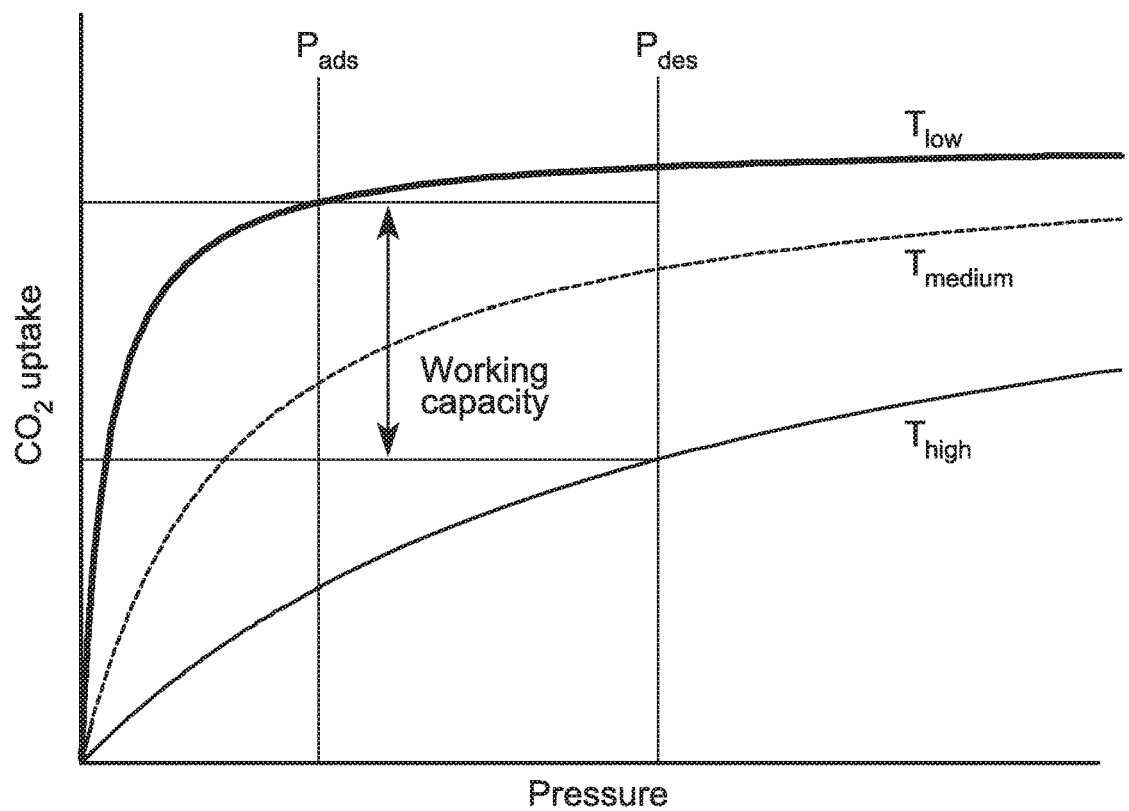
FIG. 2A is an idealized adsorption isotherm with a typical Langmuir-type isotherm shape.

FIG. 2A depicts variations in idealized $CO_2$ adsorption behavior with temperature for a classical microporous adsorbent showing the usual Langmuir-type isotherm shape. This can be compared with the isotherm shape of FIG. 2B of the phase-change adsorbent showing a step-shaped (sometimes referred to as 'S-shaped') isotherm. The double-headed black arrow in FIG. 2A and FIG. 2B indicates the working capacity (that is, the amount of gas removed) for a separation performed using a temperature swing adsorption process in which selective adsorption occurs at Pads and $T_{low}$ and desorption is performed at $P_{des}$ and $T_{high}$ for a classical adsorbent or $T_{medium}$ for the phase change adsorbent described herein.

Figure 2B:
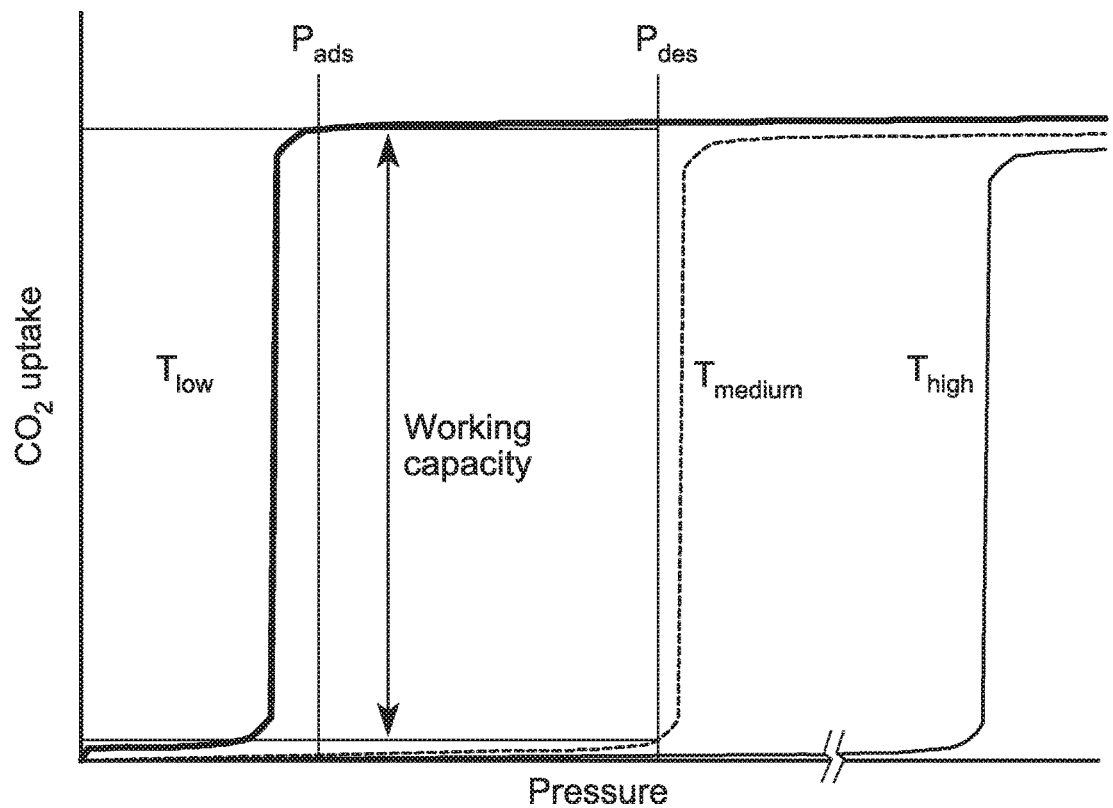
FIG. 2B is a step shaped isotherm of one embodiment of the present technology.

FIG. 2A and FIG. 2B illustrates the extraordinary advantages associated with utilizing an adsorbent exhibiting step-shaped isotherms in a temperature swing adsorption process versus the Langmuir-type isotherms observed for most microporous adsorbents. For carbon capture applications, a gas mixture containing $CO_2$ at low pressure and low (Pads) temperature ($T_{low}$) is contacted with the adsorbent, which selectively adsorbs a large amount of $CO_2$. The adsorbent is heated to liberate pure $CO_2$ with a partial pressure of $P_{des}$, and is then reused for subsequent adsorption/desorption cycles. For a classical adsorbent isotherm as shown in FIG. 2A, the steepness of the isotherm gradually diminishes as the temperature increases, necessitating a high desorption temperature to achieve a significant working capacity for a separation. In contrast, for a phase-change adsorbent of the type described here (FIG. 2B), the position of the isotherm step shifts dramatically to higher pressures as the temperature increases, such that a large working capacity can be achieved with only a small increase in temperature. The $CO_2$ adsorption isotherm can be tuned to match the step position with the partial pressure of $CO_2$ in the gas mixture. For an efficient carbon capture process, one would ideally create a phase-change adsorbent with a large vertical step positioned just below the partial pressure of $CO_2$ in the flue gas.

It has been shown that the $CO_2$ adsorption isotherm step position is primarily related to the metal-amine bond strength. Manipulation of the bond strength will allow control over the isotherm step positions that are shown in FIG. 2B. For example, the metal-heteroatom (particularly metal-amine) bond strength, and therefore $CO_2$ step position, can be adjusted by changing the identity of the metal in the framework. Likewise, the metal-heteroatom bond strength, and therefore the $CO_2$ step position, can be adjusted by changing the identity of the heteroatom.

Figure 6:
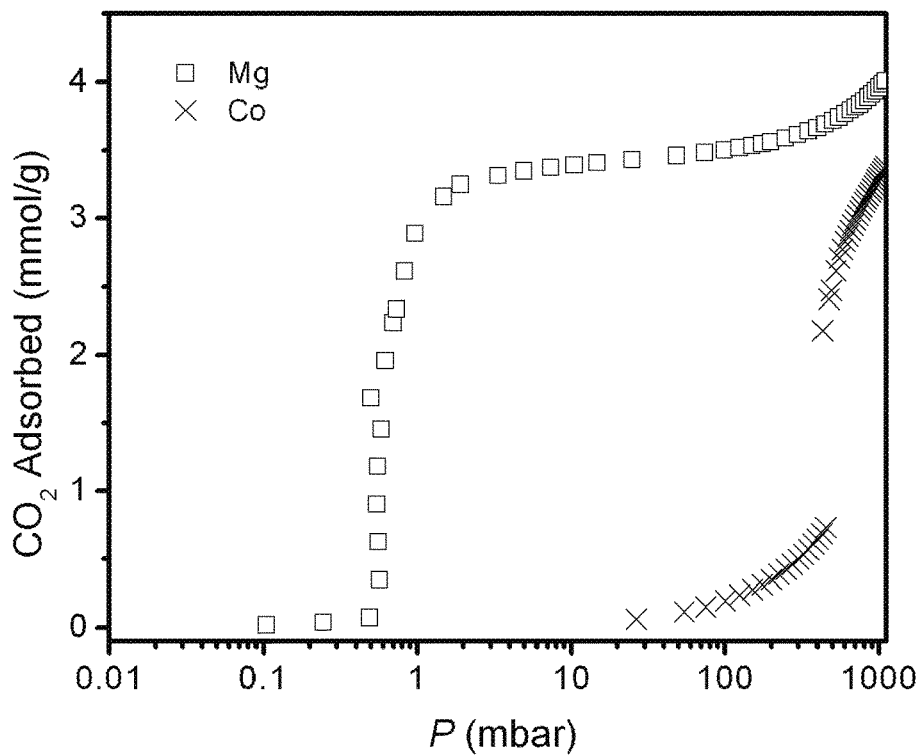
FIG. 6 depicts $CO_2$ adsorption isotherms at 40° C. shown on a logarithmic scale for N,N'-dimethylethylenediamine derivatives of $Mg_2$(dobpdc) and $Co_2$(dobpdc). The difference in the isotherm step position is attributable to changes in the metal-amine bond strength differences between Mg and Co.

For example, functionalization of $Mg_2$(dobpdc) and $Co_2$(dobpdc) frameworks with N,N'-dimethylethylenediamine results in two frameworks that vary by only the identity of the metal. As shown in FIG. 6, the difference in the isotherm step position is attributable to changes in the metal-amine bond strength differences between Mg and Co. The strength of the amine-Co bond is expected to be stronger than the amine-Mg bond. For cooperative adsorption to occur, the amine-metal bond must first break. The stronger amine-Co bond results in a less exothermic adsorption process. Thus, the step in the Co adsorbent occurs at higher pressures than the Mg adsorbent because the bond strength was tuned to change the overall enthalpy of the reaction as illustrated in FIG. 6.

Another way of tuning the metal-amine bond strength to change the step position is by changing the amine ligand. For example, $Mg_2$(dobpdc) can be functionalized with two isomers of dimethylethylenediamine. N,N-dimethylethylenediamine (one primary amine and one tertiary amine (abbreviated as 1°-ethyl-3°) and N,N'-dimethylethylenediamine (two secondary amines abbreviated for this discussion 2°-ethyl-2°). For 1°-ethyl-3° the primary amine is the better ligand for the metal and will coordinate stronger than the all secondary amine 2°-ethyl-2°. Because the primary amine-Mg bond is stronger than the secondary amine-Mg bond, the adsorption reaction containing 1°-ethyl-3° will be less exothermic than the reaction with the adsorbent containing only 2°-ethyl-2°. Thus, by changing the nature of the amine preferentially coordinated to the metal cation the position of the step can change.

Figure 8:
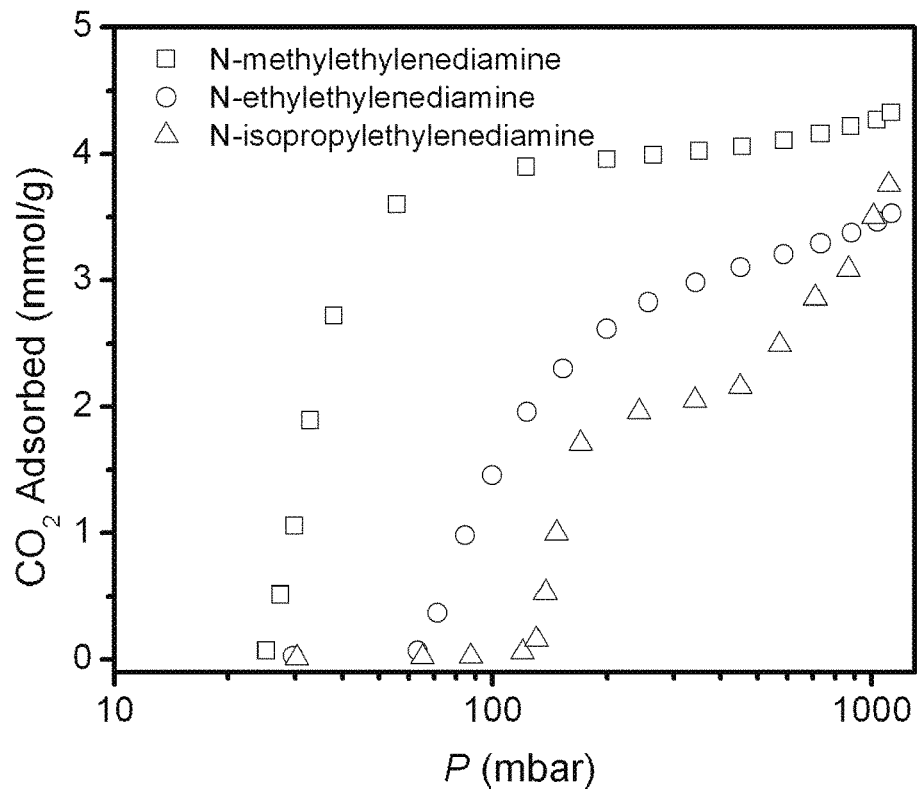
FIG. 8 depicts $CO_2$ adsorption isotherms at 100° C. shown on a logarithmic scale for N-methylethylenediamine, N-ethylethylenediamine, and N-isopropylethylenediamine derivatives of $Mg_2$(dobpdc). The difference in the isotherm step position is attributable to changes in bond strengths that result from the steric and electronic property differences that occur as alkyl group of different sizes are included in the framework.

Similarly, $Mg_2$(dobpdc) can be functionalized with a series of diamines containing one primary amine and one secondary amine. The alkyl group of the secondary amine was varied to include N-methylethylenediamine, N-ethylethylenediamine, and N-isopropylethylenediamine. At any temperature the step position of the methyl group containing material occurs before the step position of the ethyl group-containing compound. Similarly, the step position of the ethyl group occurs between the isopropyl containing material. These changes are attributable to changes in bond strengths owing to the steric and electronic property differences that occur as alkyl group of different sizes are included in the framework as shown in FIG. 8.

Figure 7:
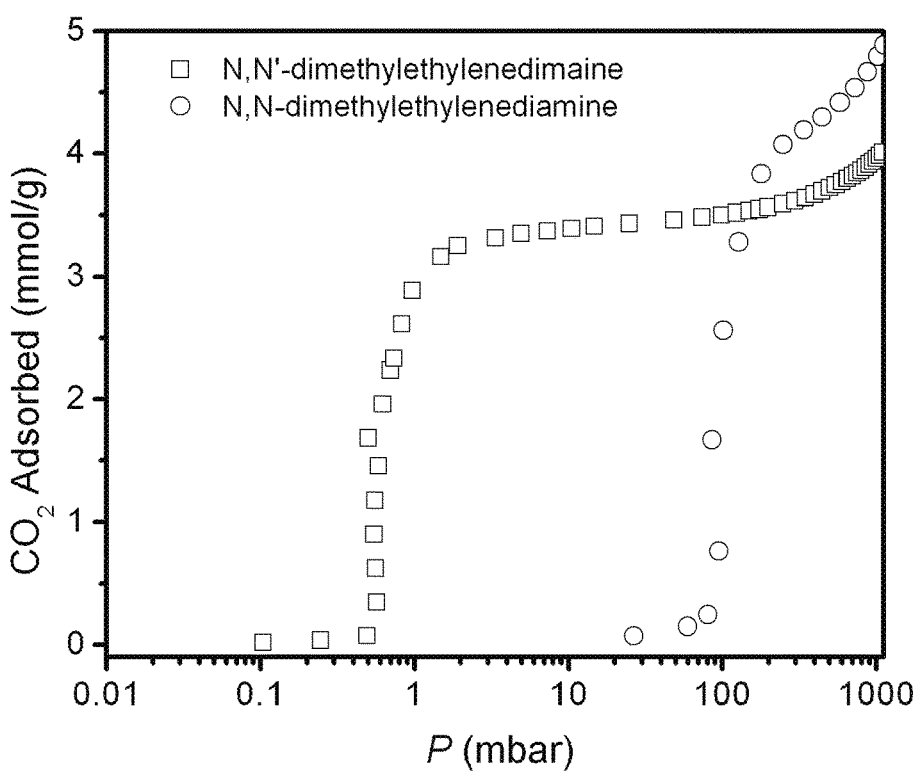
FIG. 7 depicts $CO_2$ adsorption isotherms at 40° C. shown on a logarithmic scale for N,N'-dimethylethylenediamine and N,N-dimethylethylenediamine derivatives of $Mg_2$(dobpdc). The difference in the isotherm step position is attributable to changes in the metal-amine bond due to changes in the steric and electronic properties of the amine that is bonded to the metal site.

Metal-heteroatom bond strength, and therefore $CO_2$ step position, can also be adjusted by changing the identity of the substituents on the heteroatom. Specifically, metal-amine bond strength, and therefore $CO_2$ step position, can be adjusted by changing identity of the amine steric and/or electronic properties. As shown in FIG. 7, the difference in the isotherm step position is attributable to changes in the metal-amine bond owing to changes in the steric and electronic properties of the amine that is bonded to the metal site.

Figure 11:
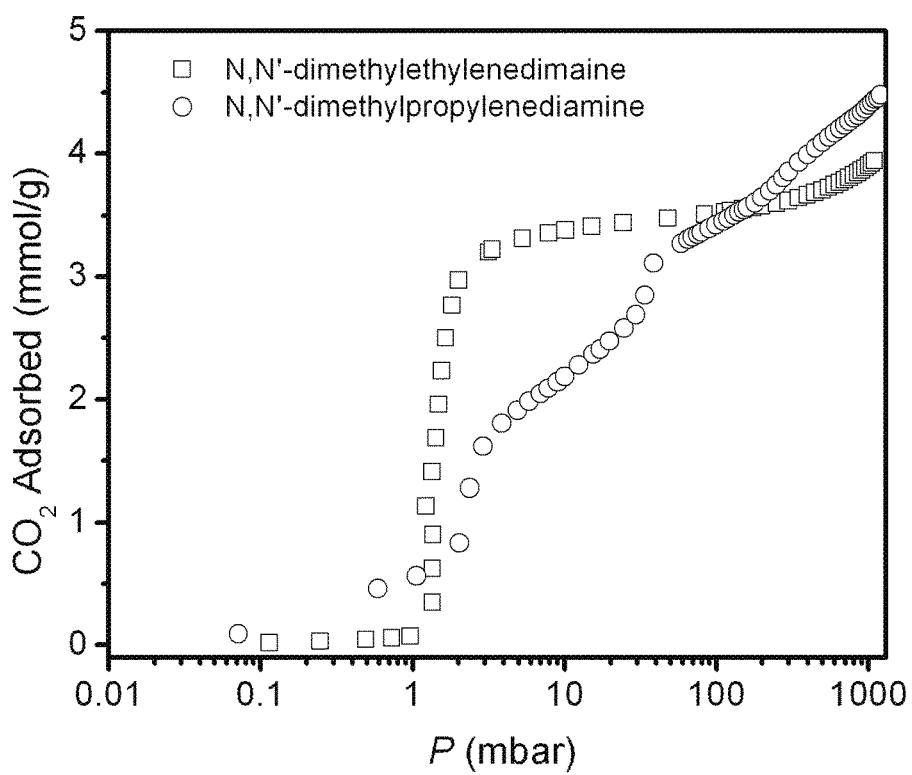
FIG. 11 depicts $CO_2$ adsorption isotherms at 50° C. shown on a logarithmic scale for N,N'-dimethylethylenediamine and N,N'-dimethylpropylenediamine derivatives of $Mg_2$(dobpdc). The difference in the isotherm step position and number of steps is attributable to changing the length of the bridge between the two diamines.

For example, $Mg_2(dobpdc)$ can be functionalized N,N'-dimethylethylenediamine and N,N'-dimethylpropylenediamine. By changing the length of the bridge that separates the two diamines, the position and number of steps in the isotherm can be changed since the orientation and energetics of the ammonium carbamate changes. FIG. 11 depicts $CO_2$ adsorption isotherms at 50° C. shown on a logarithmic scale for N,N'-dimethylethylenediamine and N,N'-dimethylpropylenediamine derivatives of $Mg_2(dobpdc)$. The difference in the isotherm step position and number of steps is attributable to changing the length of the bridge between the two diamines.

Figure 12:
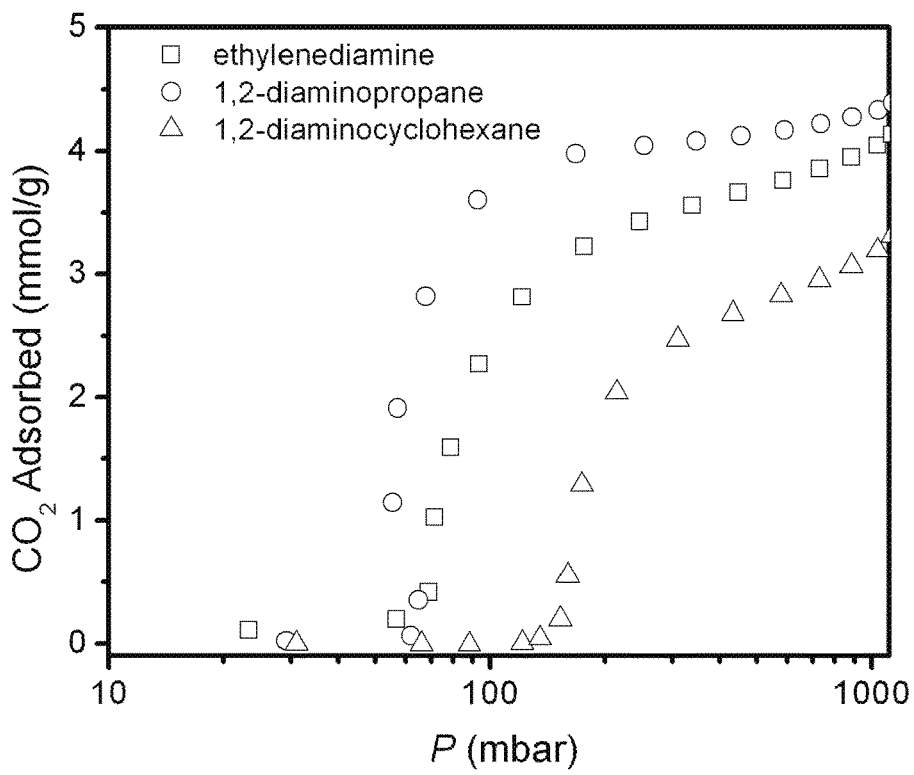
FIG. 12 depicts $CO_2$ adsorption isotherms at 120° C. shown on a logarithmic scale for ethylenediamine, 1,2-diaminopropane, and 1,2-diaminocyclohexane derivatives of $Mg_2$(dobpdc). The difference in the isotherm step position and number of steps is attributable to changing the nature of alkyl groups on the alkyl bridge that connects the two diamines.

$Mg_2(dobpdc)$ can be functionalized 1,2-diaminopropane and 1,2-diaminocyclohexane. By changing the identity of the substituents on the carbon bridge that separates the two amines, the position of the steps is shifted versus ethylenediamine due to energy differences created by the steric bulk. For example, FIG. 12 depicts $CO_2$ adsorption isotherms at 120° C. shown on a logarithmic scale for ethylenediamine, 1,2-diaminopropane, and 1,2-diaminocyclohexane derivatives of $Mg_2(dobpdc)$. The difference in the isotherm step position and number of steps is attributable to changing the nature of alkyl groups on the alkyl bridge that connects the two diamines.

Figure 13A:
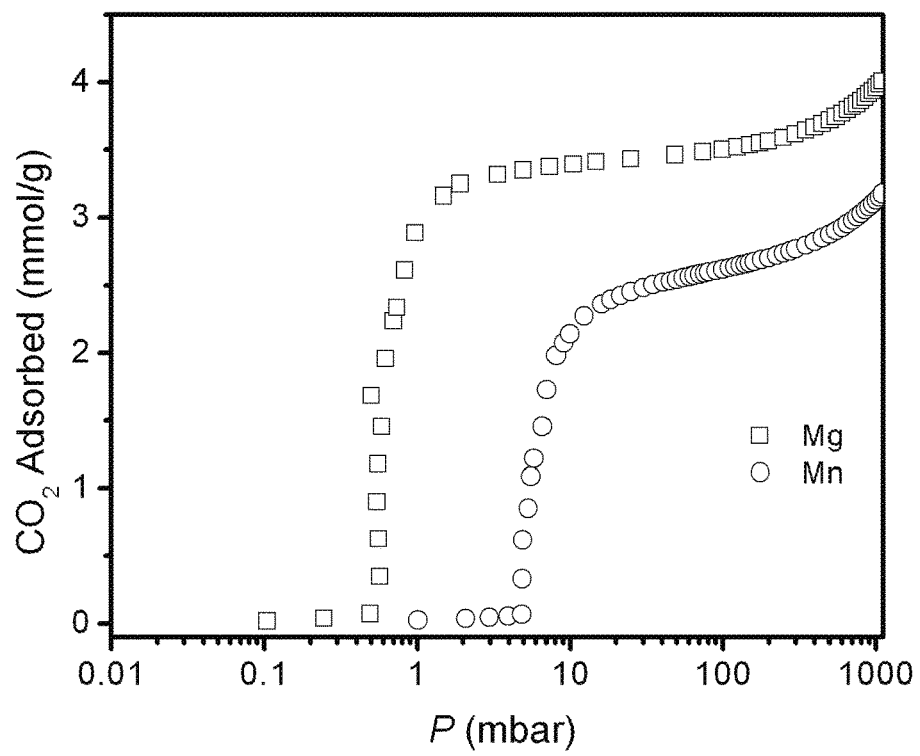
FIG. 13A depicts $CO_2$ adsorption isotherms at 40° C. shown on a logarithmic scale for N,N'-dimethylethylenediamine derivatives of $Mg_2$(dobpdc) and $Mn_2$(dobpdc). The difference in the isotherm step position is attributable to changes in the entropy of the metal-organic frameworks associated with translational, vibrational, and rotational motions of the diamines prior to $CO_2$ adsorption.
Figure 13B:
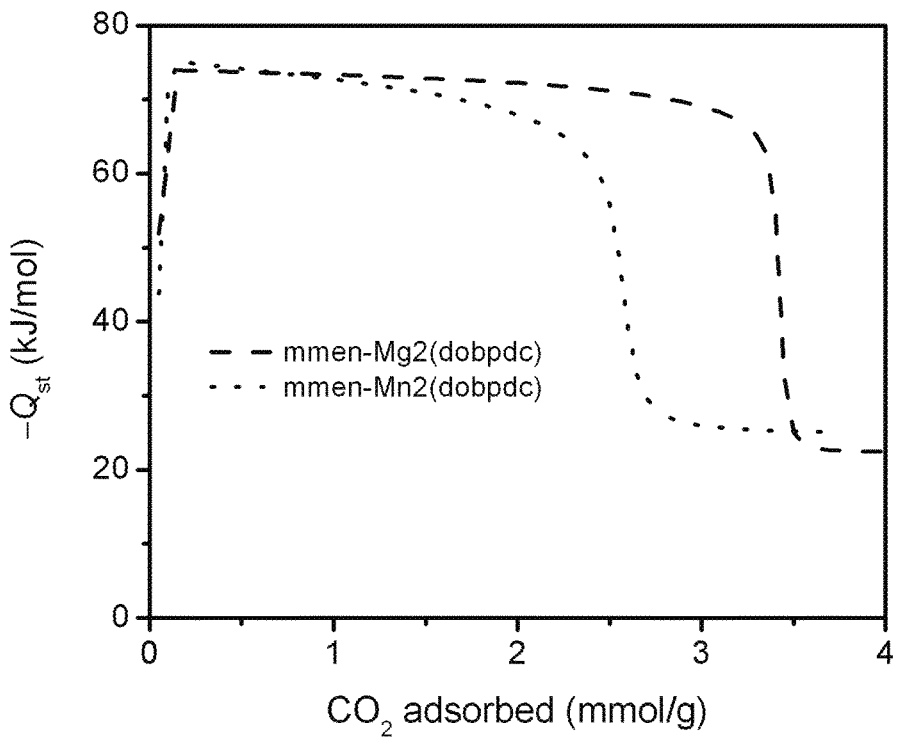
FIG. 13B depicts isosteric heats of adsorption calculations indicating nearly identical heats of $CO_2$ adsorption onto the N,N'-dimethylethylenediamine derivatives of $Mg_2$(dobpdc) and $Mn_2$(dobpdc). Differences in $CO_2$ step position are thus associated with entropic effects associated with translational, vibrational, and rotational motions of the diamines prior to $CO_2$ adsorption.

The step is associated with a large change in entropy that occurs when disordered amines and $CO_2$ become organized into chains. The initial entropy of the framework is related to the strength of the metal-amine bond and to what extent the diamine can move with translation, vibrational, and rotational degrees of freedom. Thus, two adsorbents can have steps in different positions despite very similar heats of adsorption owing to entropy differences between the materials. This is exemplified by $Mg_2(dobpdc)$ and $Mn_2(dobpdc)$ which possess nearly identical heats of adsorption but different step positions related to the extent that amines are dynamic on the pore surfaces. See FIG. 13A and FIG. 13B. The differences in $CO_2$ step position are thus associated with entropic effects associated with the translational, vibrational, and rotational motions of the diamines prior to $CO_2$ adsorption.

The strength of the C—N bond in a carbamate and the strength of the N—H bond of the ammonium can be changed by altering the steric and/or electronics of the amine. The strength of the ionic interactions between the ammonium and carbamate can also be changed by altering the sterics and/or electronics of both amines. The strength of the carbamate-metal bond can also be changed by changing the identity of the metal.

Figure 10:
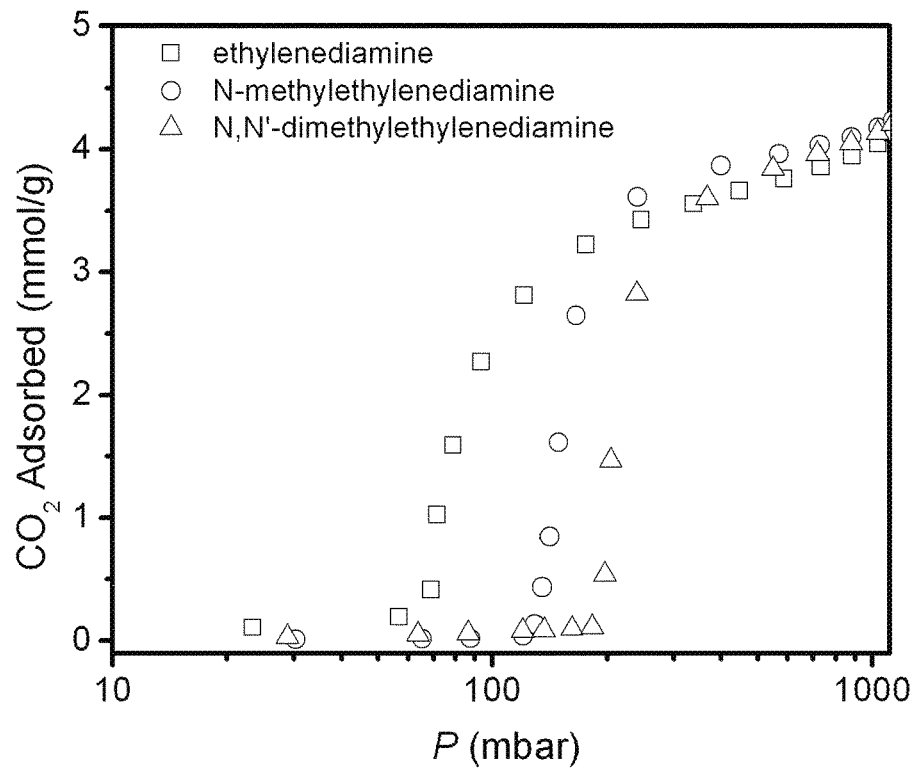
FIG. 10 depicts $CO_2$ adsorption isotherms at 120° C. shown on a logarithmic scale for ethylenediamine, N-methylethylenediamine, and N,N'-dimethylethylenediamine derivatives of $Mg_2$(dobpdc). The difference in the isotherm step position is attributable to increasing the strength of interaction between the amine and $CO_2$ that form the carbamate or increasing the strength of the ammonium carbamate interaction can overcome the increased metal-amine bond strength associated with primary amines.

For example, $Mg_2(dobpdc)$ can be functionalized ethylenediamine, N-methylethylenediamine, and N,N'-dimethylethylenediamine. FIG. 10 depicts $CO_2$ adsorption isotherms at 120° C. shown on a logarithmic scale for ethylenediamine, N-methylethylenediamine, and N,N'-dimethylethylenediamine derivatives of $Mg_2(dobpdc)$. The difference in the isotherm step position is attributable to increasing the strength of interaction between the amine and $CO_2$ that form the carbamate or increasing the strength of the ammonium carbamate interaction can overcome the increased metal-amine bond strength associated with primary amines.

The step of the adsorbent containing all primary amines occurs prior to the step of the adsorbent containing one primary and one secondary amine. Similarly, the step of the adsorbent containing one secondary amine occurs before the step of the adsorbent containing two secondary amines. Thus, increasing the strength of interaction between the amine and $CO_2$ that form the carbamate or increasing the strength of the ammonium carbamate interaction can overcome the increased metal-amine bond strength associated with primary amines.

Similarly, $Mg_2(dobpdc)$ can be functionalized with a series of diamines containing one primary amine and one tertiary amine. The identity of the alkyl groups on the tertiary amines can be varied to include N,N-dimethylethylenediamine, N,N-diethylethylenediamine, and N,N-diisopropylethylenediamine. Due to the reduced steric bulk of the primary amine, the primary amine is expected to coordinate to the metal cation in all three cases. Because of the presence of hydrogen atoms on only the primary amine, the carbamate must form on the primary amine end of the diamine while ammonium must form of the carbamate end of the diamine. At any temperature, the step position of the dimethyl containing adsorbent occurs before the step of the diethyl containing adsorbent. Similarly, the step of the diethyl containing adsorbent occurs before the step of the diisopropyl containing compound. These changes are attributable to differences in the strength of the tertiary amine with the accepted proton (the ammonium species) and the strength of the ammonium group-carbamate group ammonium interaction.

Figure 9:
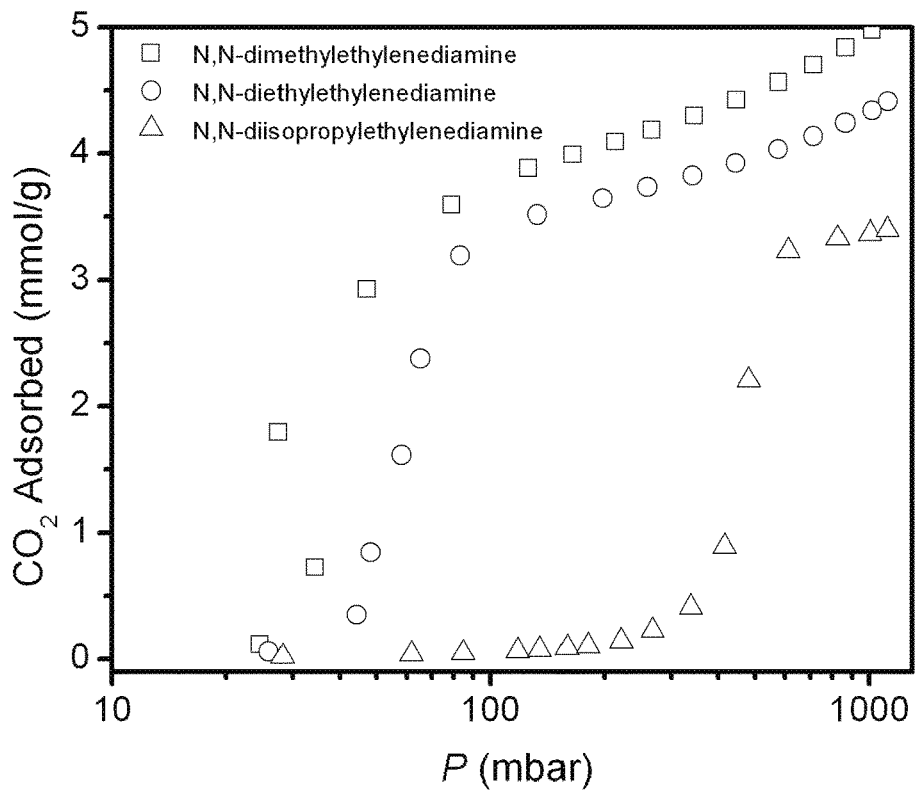
FIG. 9 depicts $CO_2$ adsorption isotherms at 25° C. shown on a logarithmic scale for N,N-dimethylethylenediamine, N,N-diethylethylenediamine, and N,N-diisopropylethylenediamine derivatives of $Mg_2$(dobpdc). The difference in the isotherm step position is attributable to differences in the strength of the tertiary amine with the accepted proton (the ammonium species) and the strength of the ammonium group-carbamate group ammonium interaction due to the presence of different amounts of steric bulk.

FIG. 9 depicts $CO_2$ adsorption isotherms at 25° C. shown on a logarithmic scale for N,N-dimethylethylenediamine, N,N-diethylethylenediamine, and N,N-diisopropylethylenediamine derivatives of $Mg_2(dobpdc)$. The difference in the isotherm step position is attributable to differences in the strength of the tertiary amine with the accepted proton (the ammonium species) and the strength of the ammonium group-carbamate group ammonium interaction owing to the presence of different amounts of steric bulk.

The adsorption properties can also be changed by altering the character of the connections between the two amines, including (adding extra alkyl groups to the connection, using cyclic hydrocarbons (such as cyclohexane), and changing the chirality of the amine positions.

The adsorption of acid gases is related to the interaction of multiple amines with acid gases to cooperatively adsorb molecules. Other non-acid gases do not adsorb via cooperative mechanisms including $H_2O$, $N_2$, and hydrocarbons (including but not limited to $CH_4$). Through variation of the amine sterics, the surface area available for other gases to adsorb onto can be changed without altering the volumetric capacity of the adsorbent for acid gases such as $CO_2$. Thus, variations of the amine sterics can be used to increase or decrease the amount of other gases adsorbed onto other accessible pore spaces.

The adsorption of acid gases, especially $CO_2$, occurs via insertion of $CO_2$ into the metal-amine bonds to form carbamates. During desorption, the potential for amine loss exists due to the disconnection between the amine and the framework. Thus, the rate of adsorbent degradation can be controlled by changing the strength of the metal-amine bond, such that stronger bonds will reduce amine volatility.

Figure 14:
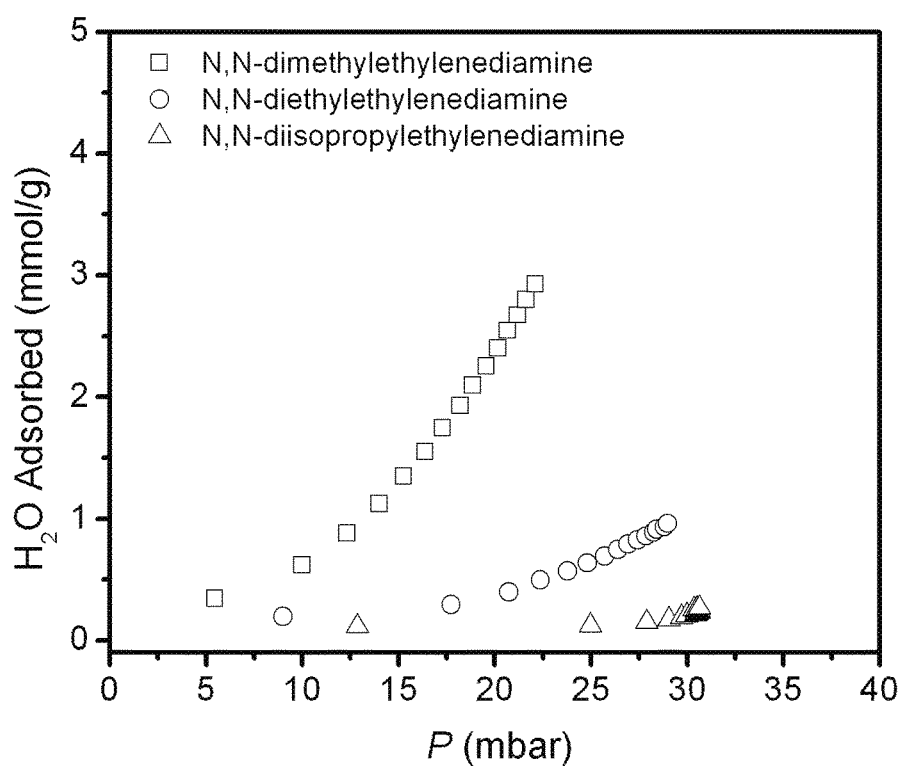
FIG. 14 depicts $H_2O$ adsorption isotherms at 40° C. shown on a linear scale for N,N-dimethylethylenediamine, N,N-diethylethylenediamine, and N,N-diisopropylethylenediamine derivatives of $Mg_2$(dobpdc). The difference in the amount of water adsorbed at a particular pressure is attributable to using alkyl groups of various sizes to reduce the amount of pore space available for non-acid gas molecules to adsorb.

Furthermore, heavier amines will generally exhibit increased boiling points. Thus, inclusion of steric groups can be used to decrease amine volatility such that the boiling point of the pure amine will be a higher temperature than the optimum adsorbent regeneration temperature. In addition, the difference in the amount of water adsorbed at a particular pressure is attributable to using alkyl groups of various sizes to reduce the amount of pore space available for non-acid gas molecules to adsorb as shown in FIG. 14.

Accordingly, exercise of control over the various bond strengths can allow control over: (i) optimum adsorption temperature/pressure, (ii) optimum desorption temperature/pressure; and (iii) the heat of adsorption/desorption.

Once the functionalized framework has been prepared and the operational parameters have been identified, a mixture stream of gases can be exposed to the solid-phase material for separation at block 50 of FIG. 1 to produce a gaseous stream depleted in $CO_2$ and a solid-phase composition enriched in $CO_2$ or other acid gas. The separation conditions as well as the composition of the solid-phase material are also controlled to optimize the separations at block 50.

At block 60, the solid-phase composition enriched in acid gas is regenerated so that it can be reused. This is usually accomplished by exposure of the solid-phase composition to elevated temperatures to release the separated gas that is subsequently removed from the system.

To increase the fraction of $CO_2$ removed from the gas stream the location of the isotherm step should be shifted to lower pressures. This can be accomplished by varying the relative strength of the amine-$CO_2$ and amine-MOF interactions.

To reduce the temperature of regeneration a higher pressure step is more advantageous than a lower pressure step. This can be accomplished by varying the relative strength of the amine-$CO_2$ and amine-MOF interactions as well.

To reduce the regeneration energy, it may be favorable to choose an amine that is optimally adsorbed at pressure higher or lower than atmospheric pressure as demonstrated here. Thus, the amine can be chosen to allow for regeneration to occur under vacuum or pressurized conditions.

To reduce the enthalpy of adsorption/desorption, an adsorbent with a step at a higher pressure over a lower pressure is desirable. This can be accomplished by varying the relative strength of the amine-$CO_2$ and amine-MOF interactions.

To change the step position, the entropy the amines have on the surface of the framework can be changed. This can be accomplished by changing the rate of diamine exchange, which is dependent on the strength of the metal-amine bond and varies for each metal.

To increase heat removal from the bed during adsorption it is advisable to increase temperature differential between the adsorption bed temperature and the temperature of the heat sink. By shifting the isotherm through variation of the bond strengths, it is possible to design an adsorbent that can effectively remove $CO_2$ at high temperatures.

Adsorption is favorable when the free energy of the phase containing ordered chains of ammonium carbamate is lower in energy than the configuration that allows for adsorption to occur via non-cooperative processes. This is related to the enthalpy of adsorption, the entropy of the solid phase and the entropy of the gas phase. Thus, optimum adsorption and desorption conditions can be controlled by altering the entropy of the gas phase surrounding the adsorbent. The entropy of the gas mixture can be changed by varying the temperature of the gas phase, the pressure of the gas phase, or the composition of the gas phase. For example, during a process that results in the co-adsorption of multiple adsorptives simultaneously (for example $CO_2$ and $H_2O$), the presence of multiple gases during desorption can be used to decrease the temperature of desorption owing to the increased entropy of the mixed gas phase during the desorption process.

The technology described herein may be better understood with reference to the accompanying examples, which are intended for purposes of illustration only and should not be construed as in any sense limiting the scope of the technology described herein as defined in the claims appended hereto.

Example 1

In order to demonstrate the technology, several diamine-appended metal-organic frameworks (mmen-$M_2$(dobpdc)) (mmen=N,N'-dimethylethylenediamine; M=Mg, Mn, Fe, Co, Zn; dobpdc$^{4-}$=4,4'-dioxidobiphenyl-3,3'-dicarboxylate) were produced and tested.

All reagents and solvents were obtained from commercial sources at reagent grade purity or higher. A 10% v/v stock solution of N,N"-dimethylethylenediamine (mmen) in hexanes was used for amine functionalization reactions. The mmen solution was stored under $N_2$ and was kept free of $H_2O$ contamination by the inclusion of freshly ground $CaH_2$ in the 200 mL Schlenk flask. The compound $H_4$(dobpdc) was synthesized using conventional methods.

For the synthesis of $Mg_2$(dobpdc), $H_4$dobpdc (27.4 mg, 0.10 mmol) was added to a 20-ml glass scintillation vial and $Mg(NO_3)_2 \cdot 6H_2O$ (64.0 mg, 0.25 mmol), and 10 ml of mixed solvent (55:45 MeOH:DMF) were subsequently added. The vial was sealed with a PTFE-lined cap and placed in a 2 cm deep well plate on a 393 K hot plate. After 12 h a white powder formed on the bottom and walls of the vial. The reaction mixture was then decanted and the remaining powder was soaked in DMF at 343 K for 12 hours, after which the solvent was decanted and replaced with fresh DMF. This process was repeated 6 times over the course of 3 days. The solvent was switched to MeOH and the process repeated until by infrared spectroscopy the amide stretch of DMF was no longer apparent. The solid was then collected by filtration and fully desolvated by heating under dynamic vacuum (<10 pbar) at 523 K for 24 h to afford 23.3 mg (0.073 mmol), 73% of $Mg_2$(dobpdc).

A similar synthesis scheme was utilized to produce: 33.8 mg (0.0889 mmol), 89% of $Mn_2$(dobpdc); 2.395 g (6.28 mmol), 93% of $Fe_2$(dobpdc); 54.1 mg (0.139 mmol), 93% of $Co_2$(dobpdc); 21.4 mg (0.0534 mmol), 53% of $Zn_2$(dobpdc) and 39.3 mg (0.101 mmol), 68% of $Ni_2$(dobpdc) for analysis.

Laboratory powder X-ray diffraction patterns were collected on a Bruker AXS D8 Advance diffractometer equipped with Cu-Kα radiation (λ=1.5418 Å), a Göbel mirror, a Lynxeye linear position-sensitive detector, and mounting the following optics: fixed divergence slit (0.6 mm), receiving slit (3 mm), and secondary beam Soller slits (2.5°). The generator was set at 40 kV and 40 mA, due to the oxygen sensitivity of $Fe_2$(dobpdc) and mmen-$Fe_2$(dobpdc), X-ray diffraction patterns were collected in sealed glass capillaries placed on the powder stage. Infrared spectra were collected on a Perkin-Elmer Spectrum 400 equipped with an attenuated total reflectance (ATR) accessory. Thermogravimetric analysis (TGA) was carried out at a ramp rate of 2° C./min in a nitrogen flow with a TA Instruments Q5000.

Elemental analyses for C, H, and N were performed at the Microanalytical Laboratory of the University of California, Berkeley.

Example 2

To further demonstrate the operational principles of the methods, spectroscopic and diffraction measurements were undertaken to determine the mechanism of $CO_2$ uptake leading to a steep adsorption step for adsorbents such as mmen-$Mg_2$(dobpdc). In particular, powder X-ray diffraction studies, which were performed on the isostructural compound mmen-$Mn_2$(dobpdc) due to the greater crystallinity of its base framework, provided detailed structural information on how $CO_2$ binds within the channels of the material. Diffraction data collected at 100K before and after exposure of a sample to 5 mbar of $CO_2$ showed the unit cell volume contracting by just 1.112(8)%, but revealed large changes in the relative intensity of selected diffraction peaks.

Complete structural models were developed for both data sets using the simulated annealing method, as implemented in TOPAS-Academic, followed by Rietveld refinement against the data. Before exposure to $CO_2$, the mmen molecules were bound through one amine group to the $Mn^{+2}$ sites with a Mn—N distance of 2.29(6) A°, whereas the other amine lay exposed on the surface of the framework. Counter to the initial assumption that the uncoordinated amine groups would serve to bind $CO_2$, $CO_2$ adsorption instead occurred by means of full insertion into the Mn—N bond, resulting in a carbamate with one O atom bound to Mn at a distance of 2.10(2) A°. The second O atom of the carbamate had a close interaction of 2.61(9) A° with the N atom of a neighboring mmen, resulting in chains of ammonium carbamate running along the crystallographic c axis of the structure. The observed ammonium carbamate N . . . O distance was similar to the distance of 2.66-2.72 A° in a single crystal of pure mmen-$CO_2$ (methyl (2-(methylammonio) ethyl) carbamate). This well-ordered chain structure was maintained at 295 K, as determined from a full Rietveld refinement against data collected at this temperature. Thus, the adsorption of $CO_2$ at ambient temperatures is associated with a structural transition to form an extended chain structure held together by ion pairing between the metal-bound carbamate units and the outstretched ammonium group of a neighboring mmen molecule.

Figure 3A:
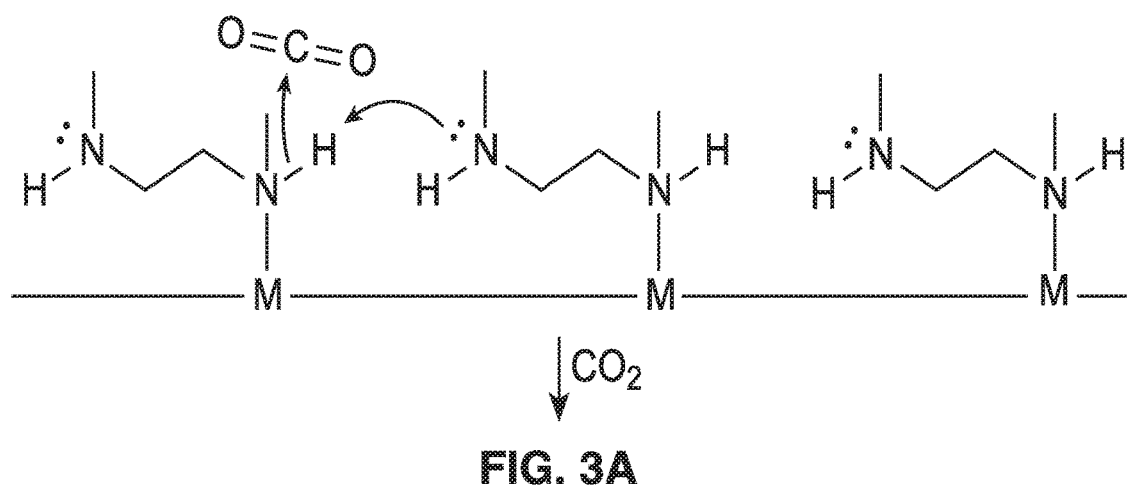
FIG. 3A through FIG. 3C depicts the mechanism for $CO_2$ adsorption at three neighboring M-mmen sites within an infinite one-dimensional chain of such sites running along the crystallographic c axis of a mmen-$M_2$(dobpdc) compound. Simultaneous proton transfer and nucleophilic attack of N on a $CO_2$ molecule forms an ammonium carbamate species that destabilizes the amine coordinated at the next metal site, initiating the cooperative adsorption of $CO_2$ by a chain reaction.
Figure 3B:
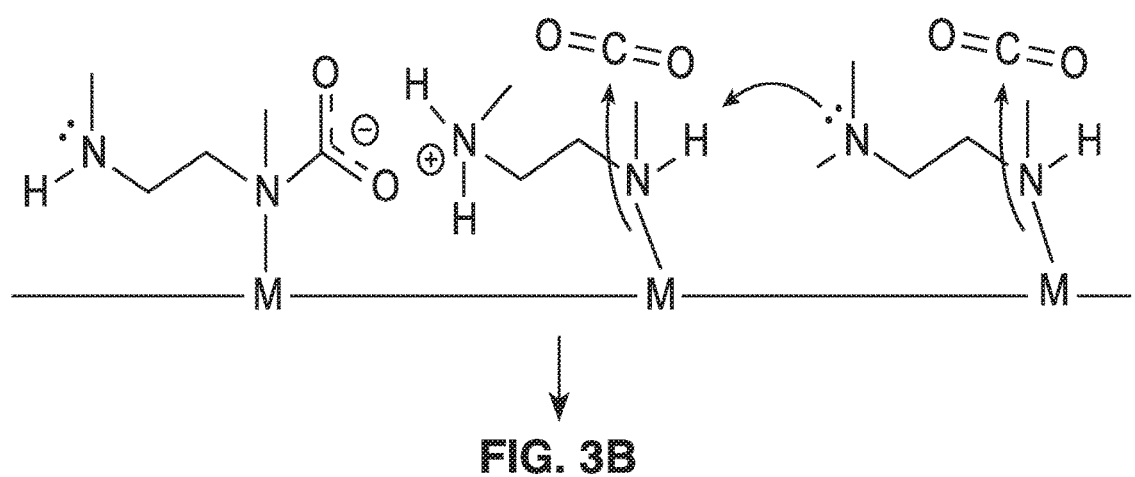
Figure 3C:
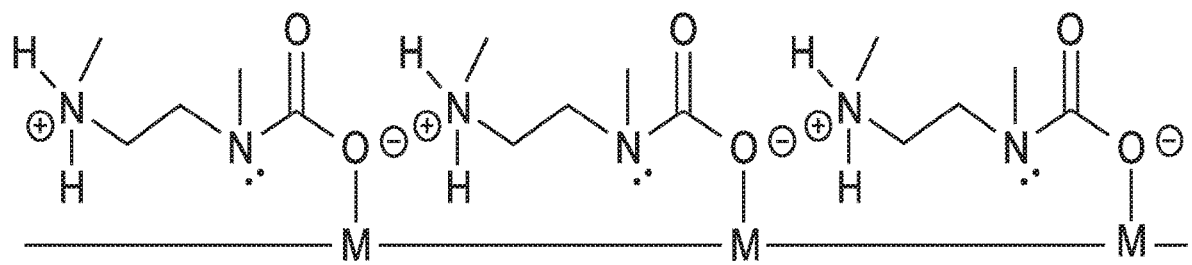

The foregoing structural information enabled the formulation of a detailed mechanism for the adsorption of $CO_2$ in phase-change adsorbents of the type mmen-$M_2$(dobpdc). As shown in FIG. 3A through FIG. 3C, the uncoordinated amine of a mmen molecule acts as a strong base to remove the acidic proton from the metal-bound amine of a neighboring mmen molecule. Deprotonation occurs only in the presence of $CO_2$, such that simultaneous nucleophilic addition of $CO_2$ results in the formation of a carbamate with an associated ammonium countercation. At suitable temperatures and pressures, rearrangement of the carbamate is possible such that the M-N bond is broken and a M-O bond is formed. The ion-pairing interaction causes the mmen molecule to stretch, destabilizing the M-N bond and facilitating insertion at the next metal site. This cooperative effect will propagate until a complete one-dimensional ammonium carbamate chain has formed. Indeed, it is this cooperativity that leads to the sudden uptake of a large amount of $CO_2$ and a steep vertical step in the adsorption isotherm.

Despite being labile, the amines were stable to evacuation under vacuum at high temperatures. This unexpected lability seems to allow substitution, but not elimination, reactions to occur rapidly under conditions relevant to carbon capture. Furthermore, the sudden adsorption of $CO_2$ in this compound is thus associated with a transition from a dynamic surface state to a well-ordered extended surface structure. Accordingly, the reaction with $CO_2$ can be considered to be thermodynamically non-spontaneous at low pressures because of the large decrease in entropy associated with this transition. Indeed, the molar entropy of gas-phase $CO_2$ was found to be the primary determinant of the step pressure for phase-change adsorbents. Step pressures for all five phase-change metal organic frameworks were shown to be linearly correlated with the gas-phase entropy of $CO_2$ as a function of temperature.

Example 3

The mechanism of $CO_2$ adsorption suggests that variation of the metal amine bond strength should provide a method of manipulating the isotherm step position. The $CO_2$ adsorption isotherms series of the mmen-$M_2$(dobpdc)(M=Mg, Mn, Fe, Co, Ni, Zn) compounds were measured at 25, 40, 50 and 75° C. With the exception of the Ni compound, which showed normal Langmuir-type adsorption behavior, all of the materials showed sharp isotherm steps that shifted to higher pressure with increasing temperature. Analysis of the isotherm steps at 25° C. yielded Hill coefficients of 10.6, 5.6, 7.5, 11.5 and 6.0 for M=Mg, Mn, Fe, Co and Zn, respectively, reflecting the cooperative nature of the $CO_2$ adsorption mechanism.

For a given temperature, the step position varies in the order Mg<Mn<Fe<Zn<Co, in good agreement with the published series for octahedral metal complex stabilities. The lack of a step for the Ni compound, even at very high pressures is attributable to the exceptional stability of the Ni-mmen bond, which prevents carbamate insertion from taking place under the conditions surveyed.

The trend in calculated adsorption energies was directly correlated with the calculated metal-amine bond length. Thus, similar variations in tuning step position will be possible for the $M_2$(dobpdc) series by altering the sterics of the amine bound to the metal, as well as the spacer between the two amine groups. Hence, depending on the concentration of $CO_2$ present in a gas mixture, an adsorbent can be rationally designed to match the optimum process conditions depicted in FIG. 1.

Although stepped adsorption isotherms have been observed previously in solid adsorbents, the origin of the step reported here is unique and distinct from all previously reported mechanisms. In contrast to most metal-organic frameworks showing such behavior, the isotherm steps reported here are not attributable to pore-opening, gate opening or pore-closing processes.

Several features unique to the mmen-$M_2$(dobpdc) series permitted phase transitions of this type to be observed. First, for solid ammonium carbamate chains to form, the metal-amine coordinate bond must be capable of rearrangement. Thus, only amines tethered to the solid surface through coordinate bonds rather than covalent bonds can undergo the rearrangement shown in FIG. 3. Second, a homogeneous surface with appropriately positioned adsorption sites, which is dictated by the location of open metal sites within the pores of the metal-organic framework, is necessary. Thus, a very limited number of metal-organic framework materials would be able to mimic the adsorption behavior and it is likely that no amine-functionalized mesoporous silica sorbent could be engineered precisely enough to meet these requirements. Notably, in contrast to the pore expanded derivatives of $M_2$(dobdc) reported here, amine functionalization of the parent $Mg_2$(dobdc) compound was not reported to result in stepped adsorption isotherms.

Example 4

Effective adsorbents for carbon capture must possess large working capacities for processes occurring at temperatures above 40° C. and at $CO_2$ partial pressures near 0.15 bar for coal flue gas or near 0.05 bar for a natural gas flue stream. On this basis, the location of the isotherm steps for the Mg and Mn compounds makes them better suited for this application than the Fe, Co or Zn compounds, which are better suited for separations from gas mixtures with higher $CO_2$ concentrations. To assess the utility of these phase-change adsorbents for capturing $CO_2$ in a pure temperature swing adsorption process, adsorption isobars were collected under dynamic gas flow. Samples of mmen-$Mg_2$(dobpdc) and mmen-$Mn_2$(dobpdc) were activated, saturated with 100% $CO_2$ and then cooled isobarically to room temperature under three different $CO_2$-containing gas mixtures: 100%, 15% and 5%. The resulting isobars reveal how small changes in temperature induced large changes in the quantity of $CO_2$ adsorbed.

Phase change adsorbents showed very large working capacities when used in temperature swing adsorption processes. For mmen-$Mg_2$(dobpdc) to give a working capacity in excess of 13 wt %, the material must simply swing between 100° C. and 150° C. Similarly, the working capacity of mmen-$Mn_2$(dobpdc) was in excess of 10 wt % when cycled between 70 and 120° C. In particular, to simulate a pure temperature swing adsorption process accurately, 15% $CO_2$ in $N_2$ was flowed over the samples during the cooling phase, whereas 100% $CO_2$ was used during heating phases.

In contrast to aqueous amine absorbents that use heat exchangers to save sensible energy costs, the greater working capacities and smaller temperature swings of phase-change adsorbents allow more economical processes to be developed for a high-enthalpy adsorbent without the use of a heat exchanger. Because phase-change adsorbents saturate with $CO_2$ at their transition point, it is not necessary for adsorption to occur at the lowest possible temperature. Whereas we previously showed that mmen-$Mg_2$(dobpdc) can operate effectively under standard flue gas adsorption conditions (40° C.).

In addition, it was observed that the phase-change adsorbents operated more efficiently at higher adsorption temperatures than at lower temperatures. Because classical adsorbents must operate at the lowest possible adsorption temperature to maximize working capacity, only phase-change adsorbents can enable high-temperature adsorption processes to be considered.

Adsorbing $CO_2$ at elevated temperatures affords several additional process benefits besides directly decreasing sorbent regeneration energy. In particular, overcoming the competitive adsorption of water vapor, which is present in flue gas at high concentrations, presents a serious challenge for solid adsorbents. Amine-based solid adsorbents fare better than those using a purely physical adsorption mechanism, because they are known to retain their affinity for $CO_2$ under humid conditions. However, even for systems where the amine reactivity with $CO_2$ is unaffected by the presence of water, the physical adsorption of water on non-amine binding sites increases the overall regeneration energy of the material.

The mmen-$Mg_2$(dobpdc) also adsorbed nearly 90% less water at 100° C. than at 40° C. Thus, the energy penalty associated with desorbing co-adsorbed water can be substantially decreased by performing $CO_2$ adsorption at a high temperature, obviating the need for strict flue gas dehumidification. No changes to the $CO_2$ adsorption isotherm were apparent after exposure to water at 40° C. or 100° C., indicating the stability of the mmen-$Mg_2$(dobpdc) in the presence of water vapor even at high temperatures.

The high effective operating temperatures of mmen-$Mg_2$(dobpdc) and mmen-$Mn_2$(dobpdc) offer opportunities for cost savings beyond just decreases in the regeneration energy. Because of the exothermic nature of all adsorption processes, the incorporation of labor and material intensive coolant pipes into an adsorbent bed (a component of the considerable infrastructure cost for carbon capture) is necessary to maintain isothermal adsorption conditions. The rate of heat transfer from a sorbent bed to the coolant pipes, which contain surface temperature water at 25° C., is primarily dependent on the heat transfer coefficient of the sorbent, the total contact area between the sorbent and the coolant pipes, and the temperature differential between the sorbent and the coolant. The physical size of adsorption units is dictated, to a great extent, by the need to provide sufficient contact area between the coolant and sorbent for effective heat removal.

For processes that are limited by heat transfer rather than mass transfer, which is likely for many $CO_2$ capture processes using solid adsorbents, the use of high temperatures will maximize the temperature differential between the coolant and the sorbent, substantially reducing the overall bed size by reducing the size of the necessary contact area. By increasing the coolant-sorbent temperature differential from about 15° C. to nearly 75° C., adsorption bed size could potentially be reduced fivefold.

In turn, smaller adsorbent beds would reduce the pressure drop across the adsorbent, reduce the size and cost of the required capital equipment, and allow as little as one-fifth as much adsorbent to be used. By decreasing these other system costs, new classes of adsorbents have the ability to reduce the cost of carbon capture substantially beyond simply decreasing the sorbent regeneration energy.

From the discussion above it will be appreciated that the technology described herein can be embodied in various ways, including the following:

1. A method for acid gas separations, the method comprising: (a) determining concentration of an acid gas from a stream of a mixture of gases; (b) preparing a porous metal organic framework of metal atoms bound to polytopic organic linkers; (c) selecting basic nitrogen ligands capable of binding with unsaturated metal ions of the organic framework with a binding strength; (d) binding the basic nitrogen ligands to coordinatively unsaturated metal ions that expose nitrogen atoms to pore volumes of the framework; and (e) contacting the framework with a stream of a mixture of gases; (f) wherein acid gas is adsorbed to the basic nitrogen ligands; and (g) wherein a step position of a produced isotherm is matched to the concentration of an acid gas from the stream of a mixture of gases.

2. The method of any preceding embodiment, wherein the gas mixture contains at least one of the following gases $CO_2$, $SO_2$, $CS_2$, $H_2S$, $SO_3$, $SR_2$, RSH, $NO_2$, $NO_3$, NO, $BR_3$, $NR_3$ where R is an organic moiety.

3. The method of any preceding embodiment, wherein the metal atoms of the framework are atoms selected from the group of atoms consisting of Al, Be, Ca, Cd, Co, Cr, Cu, Fe, Mg, Mn, Ni, Sc, Ti, V, and Zn.

4. The method of any preceding embodiment, wherein the polytopic linker is selected from the group 1,3,5-benzenetripyrazolate, 1,3,5-benzenetristriazolate, 1,3,5-benzenetristetrazolate, 1,3,5-benzenetricarboxylate, 1,4-benzenedicarboxylate; 2,5-dioxido-1,4-benzenedicarboxylate, 4,4'-dioxidobiphenyl-3,3'-dicarboxylate and 4'-4"-dioxido-3',3"-terphenyldicarboxylate.

5. The method of any preceding embodiment, wherein the basic nitrogen ligand is an alkylamine selected from the group of a primary, secondary, or tertiary alkylamine.

6. The method of any preceding embodiment, wherein the basic nitrogen ligand is an imine selected from the group of primary or secondary imines.

7. The method of any preceding embodiment, further comprising: selecting a second type of basic nitrogen ligand capable of binding with unsaturated metal ions of the organic framework with a binding strength; and binding a combination of basic nitrogen ligands to coordinatively unsaturated metal ions that expose nitrogen atoms to pore volumes of the framework nitrogen ligands.

8. The method of any preceding embodiment, further comprising: selecting the basic nitrogen ligand based on steric and electronic properties of the amines that form covalent bonds to the acid gas during adsorption.

9. The method of any preceding embodiment, further comprising: selecting the basic nitrogen ligand based on steric and electronic properties of the amines that accept protons during aggregate formation.

10. The method of any preceding embodiment, further comprising: selecting the basic nitrogen ligand based on potential ionic interactions between partners in the aggregate.

11. The method of any preceding embodiment, further comprising: selecting the basic nitrogen ligand based on strength of interaction between pairs of chains by selecting the number of carbons that separate two amines of a diamine molecule.

12. The method of any preceding embodiment, further comprising: selecting the basic nitrogen ligand based on cyclic hydrocarbon molecules bonded to the diamines to match the isotherm step position.

13. A cooperative chemical adsorption method for acid gas separations, the method comprising: (a) providing a porous metal-organic framework; (b) functionalizing pore surfaces with a plurality of ligands producing two adjacent amines that define adjacent adsorption sites; and (c) adsorbing acid gas molecules with the adjacent amine adsorption sites; (d) wherein a plurality of amines adsorb acid gas at the same time and form covalently linked aggregates of more than one ammonium carbamate ion pair; (e) wherein the aggregates spatially extend along the pore surface in at least one dimension; and (f) wherein a gaseous stream depleted in acid gas and a solid-phase composition enriched in acid gas is produced.

14. The method of any preceding embodiment, further comprising: matching a step position of a produced isotherm to a concentration of gas for removal of an acid gas by changing the strength of the bond between the metal and the basic nitrogen ligand.

15. The method of any preceding embodiment, wherein the ligand is an alkylamine selected from the group of a primary, secondary, or tertiary alkylamine.

16. The method of any preceding embodiment, wherein the ligand is an imine selected from the group of primary or secondary imines.

17. The method of any preceding embodiment, wherein the polytopic linker is 4,4'-dioxidobiphenyl-3,3'-dicarboxylate and the basic nitrogen ligand is N,N'-dimethylethylenediamine.

18. A porous metal-organic framework composition for acid gas separations, comprising: (a) a plurality of metal atoms bound to polytopic organic linkers forming a porous metal-organic framework; and (b) a plurality of ligands bound to coordinatively unsaturated metal ions that expose nitrogen atoms to pore volumes of the framework; (c) wherein a stepped isotherm is produced upon contact with a stream of mixed gases.

19. The composition of any preceding embodiment, wherein the metal atoms of the framework are atoms selected from the group of atoms consisting of Al, Be, Ca, Cd, Co, Cr, Cu, Fe, Mg, Mn, Ni, Sc, Ti, V, and Zn.

20. The composition of any preceding embodiment, wherein the polytopic linker is an aromatic compound with two or more functional azolate groups selected from the group of pyrazolate —$C_3H_2N_2^-$, triazolate —$C_2HN_3^-$, tetrazolate —$CN_4$ and carboxylate (—$CO_2$) groups.

21. The composition of any preceding embodiment, wherein the polytopic linker is selected from the group 1,3,5-benzenetripyrazolate, 1,3,5-benzenetristriazolate, 1,3,5-benzenetristetrazolate, 1,3,5-benzenetricarboxylate; 1,4-benzenedicarboxylate; 2,5-dioxido-1,4-benzenedicarboxylate; and 4,4'-dioxidobiphenyl-3,3-dicarboxylate.

22. The composition of any preceding embodiment, wherein the basic nitrogen ligand is an alkylamine selected from the group of a primary, secondary, or tertiary alkylamine.

23. The composition of any preceding embodiment, wherein the basic nitrogen ligand is an imine selected from the group of primary or secondary imine.

24. The composition of any preceding embodiment, wherein the metal is selected from the group Ca, Fe, Mn, Cu, Co, Ni, Cr and Cd and the polytopic ligand is 1,3,5-benzenetripyrazolate.

25. The composition of any preceding embodiment, wherein the metal is selected from the group Ca, Fe, Mn, Cu, Co, Ni, Cr and Cd and the polytopic ligand is 1,3,5-benzenetristetrazolate.

26. The composition of any preceding embodiment, wherein the metal is selected from the group of Cr, Mn, Fe, Co, Ni, and Cu and the polytopic ligand is 1,3,5 benzenetristriazolate.

27. The composition of any preceding embodiment, wherein the metal is selected from the group of Fe, Al, Cr, Ti, Sc, and V and the polytopic ligand is 1,3,5-benzenetriscarboxylate.

28. The composition of any preceding embodiment, wherein the metal is selected from the group of Fe, Al, Cr, Ti, Sc, and V and the polytopic ligand is 1,4-benzenedicarboxylate.

29. The composition of any preceding embodiment, wherein the metal is selected from the group of Mg, Ca, Sc, Ti, V, Cr, Mn, Fe, Co, Ni, Cu and Zn and the polytopic ligand is 2,5-dioxido-1,4-benzenedicarboxylate.

30. The composition of any preceding embodiment, wherein the metal is selected from the group of Mg, Ca, Sc, Ti, V, Cr, Mn, Fe, Co, Ni, Cu, and Zn and the polytopic linker is 4,4'-dioxidobiphenyl-3,3'-dicarboxylate.

31. The composition of any preceding embodiment, wherein the basic nitrogen ligand is an amine selected from the group of amines consisting of ethylenediamine, propylenediamine, butylenediamine, pentylenediamine, hexylenediamine, 1,2-propanediamine, 2,3-butanediamine, 1,2-diamino-2-methylpropane, N-boc-ethylenediamine, N-ethylethylenediamine, N,N'-diethylpropylenediamine, N,N-diethylethylenediamine, N-isopropylethylenediamine, N,N'-diisopropylethylenediamine, N-isopropylpropylenediamine, N,N'-diisopropylpropylenediamine, N,N'-diisopropylethylenediamine, N-methylethylenediamine, N,N'-dimethylethylenediamine, N-methylpropylenediamine, N,N'-dimethylpropylenediamine, 1,3-diaminocyclohexane, N,N-dimethylethylenediamine, N,N,N'-trimethylethylenediamine, N, N,N',N'-tetramethylethylenediamine, N-trimethylsilylethylenediamine, N,N-bis(trimethylsilyl)ethyleneidmaine, N,N'-bis(trimethylsilyl)ethyleneidmaine, N,N-dimethylpropylenediamine, N,N,N'-trimethylpropylenediamine, and N,N,N',N'-tetramethylpropylenediamine, diethylenetriamine, 2-(2-aminoethyoxy)ethylamine, dipropylenetriamine, 1,2-diaminocyclohexane, piperazine, tris(2-aminoethyl)amine, 2-(Diisopropylphosphino)ethylamine, N-methylethanolamine and monoethanolamine.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A method for acid gas separations, the method comprising:
   (a) determining temperature and pressure of an acid gas in a mixture of gases;
   (b) preparing a porous metal organic framework of metal atoms bound to polytopic organic linkers;
   (c) selecting one or more nitrogen containing ligands capable of binding to metal ions of the porous metal organic framework with a binding strength;
   (d) binding said nitrogen containing ligands to the metal ions of the porous metal organic framework to functionalize the porous metal organic framework; and
   (e) contacting the functionalized porous metal organic framework with a stream of said mixture of gases;
   (f) wherein acid gas is adsorbed to said nitrogen containing ligands;
   (g) wherein an adsorption isotherm with a discontinuity in a first derivative is produced upon contact of adsorption sites of the functionalized porous metal organic framework with the stream of mixed gases; and
   (h) wherein, by changing a metal-ligand bond strength, a position of the discontinuity in the first derivative of a produced isotherm is matched to a concentration of the acid gas from said stream of a mixture of gases.

2. The method of claim 1, further comprising:
   changing a discontinuity position of a produced isotherm to a concentration of gas for removal of an acid gas by changing the strength of the bond between the metal atoms and said nitrogen containing ligands.

3. The method of claim 1, wherein the acid gas is selected from the group of gases consisting of $CO_2$, $SO_2$, $CS_2$, $H_2S$, $SO_3$, $SR_2$, RSH, $NO_2$, $NO_3$, NO and $BR_3$.

4. The method of claim 1, wherein the metal atoms of the porous metal organic framework are atoms selected from the group of atoms consisting of Al, Be, Ca, Cd, Co, Cr, Cu, Fe, Mg, Mn, Ni, Sc, Ti, V, and Zn.

5. The method of claim 1, wherein said polytopic organic linkers are selected from the group consisting of 1,3,5-benzenetripyrazolate, benzenetristriazolate, 1,3,5-benzenetristetrazolate, 1,3,5-benzenetricarboxylate, benzenedicarboxylate; 2,5-dioxido-1,4-benzenedicarboxylate 1,4-dioxidobiphenyl-3,3-dicarboxylate and 4'-4"-dioxido-3',3"-terphenyldicarboxylate.

6. The method of claim 1, wherein said nitrogen containing ligands are an alkylamine selected from the group of a primary, secondary, and tertiary alkylamine.

7. The method of claim 1, wherein said nitrogen containing ligands are an imine selected from the group of primary or secondary imines.

8. The method of claim 1, further comprising:
   selecting a second type of nitrogen containing ligand capable of binding with metal ions of the porous metal organic framework with a binding strength; and
   binding a combination of nitrogen containing ligands to metal ions to expose a combination of different nitrogen containing ligands to a pore volume of the porous metal organic framework.

9. The method of claim 1, where the nitrogen containing ligands individually or in combination are selected from the group of ethylenediamine, propylenediamine, butylenediamine, pentylenediamine, hexylenediamine, 1,2-propanediamine, 2,3-butanediamine, 1,2-diamino-2-methylpropane, N-boc-ethylenediamine, N-ethylethylenediamine, N,N'-diethylpropylenediamine, N,N-diethylethylenediamine, N-isopropylethylenediamine, N,N'-diisopropylethylenediamine, N-isopropylpropylenediamine, N,N'-diisopropylpropylenediamine, N,N'-diisopropylethylenediamine, N-methylethylenediamine, N,N'-dimethylethylenediamine, N-methylpropylenediamine, N,N'-dimethylpropylenediamine, 1,3-diaminocyclohexane, N, N-dimethylethylenediamine, N, N, N'-trimethylethylenediamine, N, N, N', N'-tetramethylethylenediamine, N-trimethylsilylethylenediamine, N,N-bis(trimethylsilyl)ethyleneidmaine, N,N'-bis(trimethylsilyl)ethyleneidmaine, N,N-dimethylpropylenediamine, N,N,N'-trimethylpropylenediamine, N,N,N',N'-tetramethylpropylenediamine, diethylenetriamine, 2-(2-aminoethyoxy)ethylamine, dipropylenetriamine, 1,2-diaminocyclohexane, piperazine, tris(2-aminoethyl)amine, 2-(Diisopropylphosphino)ethylamine N-methylethanolamine, and monoethanolamine.

* * * * *